US012080127B2

(12) United States Patent
Oberberger et al.

(10) Patent No.: US 12,080,127 B2
(45) Date of Patent: Sep. 3, 2024

(54) HYBRID WAGERING AND SKILL-BASED GAMING SYSTEM AND SERVER

(71) Applicant: Albert Massi, Las Vegas, NV (US)

(72) Inventors: Michael Oberberger, Spring Hill, TN (US); Gregg Russell Giuffria, Las Vegas, NV (US); Joseph Baron Giuffria, Las Vegas, NV (US)

(73) Assignee: Albert Massi, Las Vegas, NV (US)

( * ) Notice: Subject to any disclaimer, the term of this patent is extended or adjusted under 35 U.S.C. 154(b) by 0 days.

(21) Appl. No.: 18/141,881

(22) Filed: May 1, 2023

(65) Prior Publication Data

US 2023/0306819 A1 Sep. 28, 2023

Related U.S. Application Data

(63) Continuation of application No. 17/326,621, filed on May 21, 2021, now Pat. No. 11,682,267, which is a (Continued)

(51) Int. Cl.
*G07F 17/32* (2006.01)
*G07F 17/34* (2006.01)

(52) U.S. Cl.
CPC ...... *G07F 17/3267* (2013.01); *G07F 17/3204* (2013.01); *G07F 17/3223* (2013.01); *G07F 17/3244* (2013.01); *G07F 17/3262* (2013.01); *G07F 17/3269* (2013.01); *G07F 17/3295* (2013.01)

(58) Field of Classification Search
None
See application file for complete search history.

(56) References Cited

U.S. PATENT DOCUMENTS 6,050,895 A 4/2000 Luciano, Jr. et al.
6,334,614 B1 1/2002 Breeding
(Continued)

FOREIGN PATENT DOCUMENTS

WO 2020172212 A1 8/2020

OTHER PUBLICATIONS

International Search Report, International Patent Application No. PCT/US2020/018733, May 11, 2020, 2 pgs.
(Continued)

*Primary Examiner* — Lawrence S Galka
(74) *Attorney, Agent, or Firm* — LOZA & LOZA, LLP; David S. Sarisky

(57) ABSTRACT

Various implementations of a method and apparatus may include executing a play of a game on the game device. Implementations may include detecting a game action event during the play of the game. Implementations may also include deducting a game action fee from a player's credit account based on the game action event during the play of the game. Implementations may also include determining a wager portion of the game action fee. Implementations may also include determining a game fund portion of the game action fee. Implementations may also include storing the game fund portion in a game fund account associated with the player. Implementations may also include determining a game fund award from the game fund account. Implementations may also include modifying the play of the game based on the game fund award.

9 Claims, 9 Drawing Sheets

Related U.S. Application Data continuation of application No. 17/014,673, filed on Sep. 8, 2020, now abandoned.

(56) References Cited

U.S. PATENT DOCUMENTS

| | | | |
|---|---|---|---|
| 7,682,239 | B2 | 3/2010 | Friedman et al. |
| 7,931,531 | B2 | 4/2011 | Oberberger |
| 8,162,742 | B2 | 4/2012 | Oberberger |
| 9,098,974 | B2 | 8/2015 | Mayeroff et al. |
| 9,159,202 | B2 | 10/2015 | De Waal et al. |
| 9,251,666 | B2 | 2/2016 | Oberberger |
| 9,440,152 | B2 | 9/2016 | Thompson et al. |
| 9,542,799 | B2 | 1/2017 | Washington et al. |
| 9,875,499 | B2 | 1/2018 | Washington et al. |
| 9,940,785 | B2 | 4/2018 | Washington et al. |
| 10,210,697 | B1 | 2/2019 | Giuffria et al. |
| 10,242,539 | B2 | 3/2019 | Oberberger |
| 10,255,765 | B2 | 4/2019 | Washington et al. |
| 10,269,214 | B2 | 4/2019 | Washington et al. |
| 10,825,301 | B2 | 11/2020 | Washington et al. |
| 10,909,809 | B2 | 2/2021 | Washington et al. |
| 11,017,637 | B2 | 5/2021 | Giuffria et al. |
| 11,403,919 | B2 | 8/2022 | Washington et al. |
| 11,625,985 | B2 | 4/2023 | Washington et al. |
| 2004/0116173 | A1 | 6/2004 | Baerlocher |
| 2005/0239538 | A1 | 10/2005 | Dixon |
| 2008/0009344 | A1 | 1/2008 | Graham et al. |
| 2008/0064491 | A1* | 3/2008 | Taylor ..................... G07F 17/32 463/25 |
| 2008/0188296 | A1* | 8/2008 | Seelig ..................... G07F 17/32 463/27 |
| 2009/0061998 | A1 | 3/2009 | Popovich et al. |
| 2009/0117974 | A1 | 5/2009 | Hornik |
| 2011/0183739 | A1 | 7/2011 | Ansari et al. |
| 2012/0208623 | A1 | 8/2012 | Friedman et al. |
| 2013/0316798 | A1* | 11/2013 | Arnone ............... G07F 17/3272 463/25 |
| 2015/0187184 | A1* | 7/2015 | De Waal ................. G07F 17/34 463/16 |
| 2015/0206393 | A1 | 7/2015 | Hoffman et al. |
| 2015/0375117 | A1 | 12/2015 | Thompson et al. |
| 2016/0063817 | A1 | 3/2016 | Guinn |
| 2016/0171835 | A1 | 6/2016 | Washington et al. |
| 2017/0124812 | A1 | 5/2017 | Washington et al. |
| 2018/0276948 | A1* | 9/2018 | Washington ........ G07F 17/3244 |
| 2019/0188967 | A1* | 6/2019 | Giuffria .............. G07F 17/3295 |

OTHER PUBLICATIONS

International Written Opinion, International Patent Application No. PCT/US2020/018733, May 11, 2020, 8 pgs.

* cited by examiner

HYBRID WAGERING AND SKILL-BASED GAMING SYSTEM AND SERVER

CROSS-REFERENCE TO RELATED APPLICATIONS

This application is a continuation of U.S. application Ser. No. 17/326,621, filed on May 21, 2021, entitled "Hybrid Wagering and Skill-Based Gaming System and Server," now U.S. Pat. No. 11,682,267, which is a continuation of U.S. application Ser. No. 17/014,673, filed on Sep. 8, 2020, abandoned, each of which is expressly incorporated by reference herein in its entirety.

FIELD OF THE DISCLOSURE

Some implementations of the disclosure relate to systems, servers, methods, and devices for computing providing enhanced functionality over the prior art. More specifically, some implementations of the disclosure relate to systems, servers, methods and devices for managing gaming on a computing device, such as an electronic gaming device.

BACKGROUND

The word "gaming" typically refers to two different concepts in the entertainment industry. In one context, sometimes referred to as entertainment gaming, gaming refers to computer or video games in which play is conducted from a gaming console, arcade machine, personal computer, cellular telephone, personal digital assistant ("PDA"), or the like. In entertainment gaming, the player usually exercises skill, logic, and strategy to influence the outcome of the game which may also be impacted by luck. Games within the entertainment gaming genre may take many different forms, including games for individuals to compete against a computer-controlled opponent (or a standard, such as a game timer or minimum score), games for individuals to compete against other individuals, games for teams to compete against other teams, or the like. While some games involve some payment, the payment is not a "wager." That is, entertainment games usually require a payment for the purchase or license of the game and/or a payment to play the game in a specific forum, such as specially designated networks or the like. However, such a payment is not in the form of a wager since the payment is typically not staked for participation in the game, and typically is not used to determine eligibility for a tangible prize.

Entertainment games may be conducted in single player or multi-player environments with each player playing the game at a separate terminal, such as a personal computer, that communicates with a server coordinating the game. Massively multi-player online games ("MMOG") such as World of Warcraft® and EverQuest® are examples of games with multi-player play, and the enormously popular game Fortnite® is an example of a massively multiplayer online role-playing game (also known as an "MMOFPS" and a Battle Royale Game ("BRG.") Real time simulation ("RTS") games such as Farmville® and Mafia Wars™ are examples of games with multi-player social interaction. The advent of social networking websites, such as Facebook®, has drawn even more players to games with multi-player play and/or multi-player social interaction. World of Warcraft® is a registered trademark of Blizzard Entertainment, Inc. of Irvine, Calif. EverQuest® is a registered trademark of Daybreak Game Company, LLC of San Diego, Calif. Fortnite® is a registered trademark of Epic Games, Inc. of Cary, N.C. Farmville® is a registered trademark of Zynga Inc. of San Francisco, Calif. Mafia Wars™ is a registered trademark of Zynga Inc. of San Francisco, Calif. Facebook® is a registered trademark of Facebook, Inc. of Menlo Park, Calif.

Many of these entertainment games include elements of skill, strategy, or other player interaction which influences the outcome of the game. The outcome of the entertainment game typically includes a score, level, achievement, or the like, which is usually non-tangible in that it has no value other than bragging rights.

The word "gaming" may also be used to refer to wagering games and gambling games. Regardless of whether the gaming occurs in a physical, brick-and-mortar casino or a virtual, online casino or online environment, these types of casino or wagering games usually include three components: a wager, chance, and a reward. That is, casino or wagering games are usually games in which the outcome of a wager ("the reward") is determined by chance, which predominates over every other factor, including skill. For example, chance predominates in card games such as poker, blackjack, or the like, even though some skill is involved. Specifically, chance, rather than the player's skill, determines which cards are dealt to the players, which cards are dealt to a dealer, if any, which cards are cut from the deck or shoe of cards, and so forth. In other wagering games, such as reel slot games, numbers games (such as keno, lotto, pull tabs, or the like), dice games, wheel games (such as roulette), or the like, chance is the only factor to determine the outcome of the wagering game, with skill having no influence on the symbols or numbers drawn, rolled, or spun.

The outcomes of wagering games can usually be determined by the probabilities that govern the games and, therefore, the hold for the game operator over the long term can be predicted. Predicting the game operator hold may not be true for skill games, in which the outcomes vary from player to player based on the player's skill. Wagering games must be operated for a profit over the long term and casinos would generally not operate games that allow certain players to improve their performance through practice. Consequently, casinos will not, and in some jurisdictions, cannot offer gambling games in which skill predominates (or even affects) the determination of the outcome of the gambling game.

A well-known consequence of the difference between skill games and chance games is the way in which casinos offer poker games versus how casinos offer house banked games. As may be appreciated, poker, in which skill plays a factor, is typically offered only in a player-banked or pari-mutuel form. In online poker and other player-banked games, massive volumes of players are required to maintain liquidity.

In a player-banked game, a player-banker banks the other players' wagers and in a pari-mutuel game, the players contribute to a pot that is awarded to the winning player(s). While player-banked and pari-mutuel games are more predictable in the short term because the casino operator does not collect losing wagers and pay winning wagers, the casino operator only collects a small fee for administering and operating the game. This fee is levied regardless of the outcome of the game, so the casino operator makes money on every game. However, because the fee is generally low, the casino operator must generally have a high volume of play to be profitable. For example, because the online casino only makes a small, scaled commission fee (also known as a "rake") on each poker game, the online casino must ensure that a large volume of players, and hence a large volume of pots to rake, are processed by the site.

Conversely, house-banked games, e.g., those games in which the online casino operator banks wagers by collecting losing wagers and paying winning wagers, are particularly profitable for casinos because the games include a built-in house edge that guarantees the game will be profitable in the long term. However, the win or loss from these games can fluctuate wildly in the short term, such as when a player has a winning streak, and the casino operator must maintain a reserve of cash to pay off all winning bets.

SUMMARY

Implementations of the present technology may include a method of operating a game device, including executing a play of a game on the game device. Implementations may also include detecting a game action event during the play of the game. Implementations may also include deducting a game action fee from a player's credit account based on the game action event during the play of the game. Implementations may also include determining a wager portion of the game action fee. Implementations may also include determining a game fund portion of the game action fee. Implementations may also include storing the game fund portion in a game fund account associated with the player. Implementations may also include determining a game fund award from the game fund account. Implementations may also include modifying the play of the game based on the game fund award.

Implementations may also include randomly determining an outcome for a wagering event for the wager. Implementations may also include determining an award based on the outcome of the wagering event when the outcome is a winning outcome. In some implementations, modifying the play of game based on the game fund may also include, debiting a game fund award amount from the game fund account. Implementations may also include provide at least one in-game asset during to the player in response to debiting the game fund award amount from the game fund account associated with the player.

Implementations may also include presenting an in-game asset purchase option during the play of the game. Implementations may also include debiting a game fund award amount associated with in-game asset in response to receiving a player's selection of the in-game asset purchase option. In some implementations, the in-game assets were previously provided during the play of the game and the player failed to previously obtain the in-game assets.

In some implementations, modifying the play of the game may also include modifying a timer based on debiting a game fund award from the game fund account. In some implementations, modifying the play of the game may also include bypassing a segment of the game. In some implementations, bypassing the segment of the game, may also include, presenting a skip option for the segment of the game to the player. Implementations may also include receiving from the player, through a user interface, a selection of the skip option. In some implementations, the bypassing of the segment of the game is in response to receiving the selection of the skip option.

In some implementations, modifying the play of the game may also include starting a practice scenario during the play of the game that allows the player to practice at least one game action. In some implementations, modifying the play of the game may also include increasing a probability that in-game assets are provided during the play of the game. In some implementations, modifying the play of the game may also include adjusting a level of skill required to meet at least one game objective during the play of the game.

In some implementations, modifying the play of the game may also include, determining the value of the player's game fund account. Implementations may also include determining one of a plurality of predetermined value ranges that matches the value of the player's game fund account. In some implementations, the one of the plurality of predetermined value ranges is associated with a level setting in the game. Implementations may also include modifying the game based on the level setting of the matches the determined one of the plurality of predetermine value ranges.

In some implementations, modifying the play of the game may also include providing a game event during the play of the game in response to the game fund account reaching a threshold value. In some implementations, modifying the play of the game may also include, determining that the game fund account has reached a threshold monetary value. Implementations may also include presenting a skip option for a segment of the game. Implementations may also include skipping the segment of the game when the player selects the skip option. In some implementations, modifying the play of the game may also include, receiving, from a user interface, a selection of a skip option by the player. Implementations may also include bypassing of a segment of the game in response to receiving the selection of the skip option.

Implementations of the present technology may also include an electronic gaming device, including at least one processor. Implementations may also include at least one memory that stores computer executable instructions. In some implementations, when the computer executable instructions are executed by the at least one processor, the at least one processor are configured to, execute a play of a game on the game device. Implementations may also include detect a game action event during the play of the game. Implementations may also include deduct a game action fee from a player's credit account based on the game action event during the play of the game. Implementations may also include determine a wager portion of the game action fee. Implementations may also include determine a game fund portion of the game action fee. Implementations may also include store the game fund portion in a game fund account associated with the player. Implementations may also include determine a game fund award from the game fund account. Implementations may also include modify the play of the game based on the game fund award.

Implementations may also include randomly determine an outcome for a wagering event for the wager. Implementations may also include determine an award based on the outcome of the wagering event when the outcome is a winning outcome. In some implementations, modifying the play of game based on the game fund may also include, debit a game fund award amount from the game fund account. Implementations may also include provide at least one in-game asset during to the player in response to debiting the game fund award amount from the game fund account associated with the player.

Implementations may also include present an in-game asset purchase option during the play of the game. Implementations may also include debit a game fund award amount associated with in-game asset in response to receiving a player's selection of the in-game asset purchase option. In some implementations, the in-game assets were previously provided during the play of the game and the player failed to previously obtain the in-game assets.

DETAILED DESCRIPTION

Figure 1:
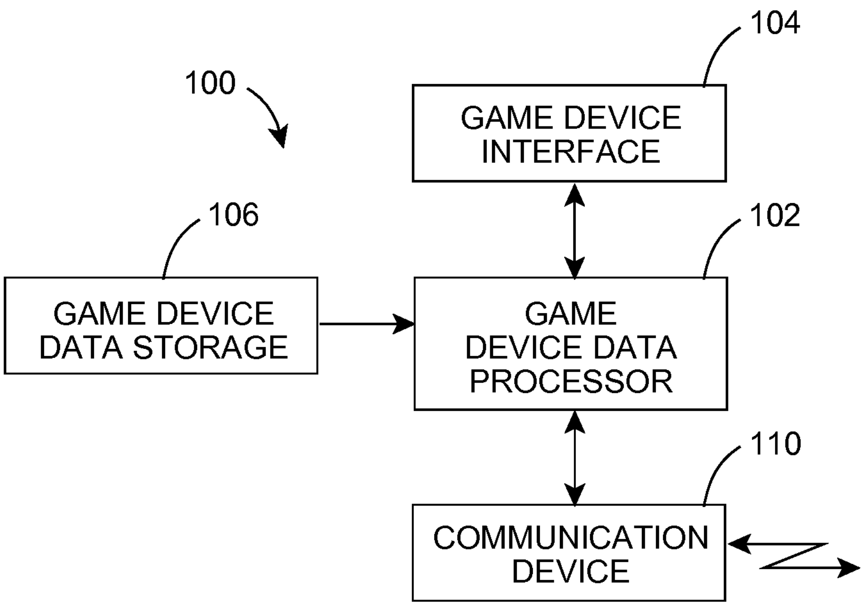
FIG. 1 is a block diagram of a game device according to some implementations of the disclosure.

Before any implementations of the disclosure are explained in detail, it is to be understood that the disclosure is not limited in its application to the details of construction and the arrangement of components set forth in the following description or illustrated in the following drawings. The disclosure is capable of other implementations and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use implementations of the disclosure. Various modifications to the illustrated implementations will be readily apparent to those skilled in the art, and the generic principles herein can be applied to other implementations and applications without departing from implementations of the disclosure. Thus, implementations of the disclosure are not intended to be limited to implementations shown, but are to be accorded the widest scope consistent with the principles and features disclosed herein. The following detailed description is to be read with reference to the figures, in which like elements in different figures have like reference numerals. The figures, which are not necessarily to scale, depict selected implementations and are not intended to limit the scope of implementations of the disclosure. Skilled artisans will recognize the examples provided herein have many useful alternatives and fall within the scope of implementations of the disclosure.

Reference is now made to the figures wherein like parts are referred to by like numerals. Referring to FIGS. 1-4, an implementation of the disclosure includes a system, server and method for linking activity in a first game to the triggering of at least a portion of a second game. In some implementations, the first game can comprise a non-gambling (also referred to as a skills-based) game, and the second game can comprise a gambling game. In some implementations, either the first and/or the second game can comprise a plurality of games. In some implementations, either the first and/or the second game can comprise a sequence of one or more games. In some implementations, either the first game and/or the second game can comprise multiple segments of a single game or multiple, separate games.

Some implementations of the disclosure may be applied to any first game (non-gambling game) and a different, logically independent, second game (gambling game). That is, some implementations of the disclosure described herein are not dependent on the specific non-gambling game and gambling game(s) involved. Thus, in some implementations, a non-gambling game may take any form including any pay-to-play, free-to-play, free-to-download, fee-to-download, or any combination thereof. Similarly, in some implementations, the second game can be conducted in any format. For example, in various implementations of the disclosure, one or more aspects of the disclosure can be applied to any wagering game in which a wager is staked for a chance to win an award, whether that wager is in the form of real money, game credits, subscription fees, or the like, and any combination thereof.

In some implementations of the disclosure, the first game can comprise a game in which no wager is staked although, as previously noted, it is contemplated that in some implementations, the non-wagering game may be free, require a subscription or fee, or require other consideration for play (e.g., joining a loyalty program, submitting data used for marketing, making a purchase, or the like). Further, it is also noted that although no wager is staked in the non-wagering game, prizes, whether tangible (such as a good, service, currency, or the like) or promotional (discounts, play currency, or the like) in nature may be offered as awards in the non-wagering game. Additionally, in some implementations of the disclosure, the non-wagering game can include a virtual economy in which real and/or virtual money can be used or exchanged for in-game thematic or game play elements. For example, in some implementations, role playing games such as World of Warcraft® and Club Penguin® have virtual economies in which in-game thematic or game play elements can be purchased by a user using in-game credits. In some implementations, any of the virtual money can be converted to real currency for delivery to the player. For example, in some implementations, a player can get paid $5,000 in virtual money, which equals $50 in real money. In some implementations, players' points that consist of real money value may shift to a higher or lower dollar value. In some implementations a player may select and/or change a denomination at any time. Club Penguin® is a registered trademark of Disney Canada Inc. of Kelowna, British Columbia, Canada.

In the non-limiting examples below, the first game may take the form of a game, puzzle, quiz, or other activity. For example, in some implementations, the first game may be a puzzle (such as a jigsaw puzzle, crossword puzzle, chess puzzle, or the like), magic number square (such as Sudoku), arcade or video game (such as Call of Duty® or Fortnite®), social game (such as Farmville®), role playing game (such as World of Warcraft®), RPG, MMORPG, MMOFPS, FPS, RTS, MOBA, BRG, logic games, trivia games, simulation game, action games, platform games, artillery games, fighting games, racing games, on-rail games, survival games, survival horror, casual games, mobile games and the like. Call of Duty® is a registered trademark of Activision, Inc., of Santa Monica, Calif.

In some implementations, a game device 100 can take any form, including, but not limited to, a mobile telephone or smart phone, a tablet device, a personal digital assistant ("PDA"), a personal computer, a kiosk, an arcade game machine, a game console, a handheld device, an electronic gaming machine, interactive television, or any other electronic device. In some implementations, the game device 100 can include a game device data processor 102 in communication with a game device interface 104 and a game device data storage 106. In some implementations, the game device interface 104 can include an output device, such as a display, and an input device. Optionally, in some implementations of the disclosure, the output device and input device can be combined, such as in a touch screen or other electronic user interface. In at least one implementation, the game device 100 can include a communication device 108 that includes at least a transmitter and/or a receiver.

In some implementations, the form of the game device 100 can vary depending on the implementation. In this regard, a system according to some implementations of the disclosure can include a plurality of game devices 100 in mixed forms. Although the non-limiting examples below reference game devices 100 as primarily casino devices, such as electronic gaming machines, live and electronic gaming tables, electronic and mechanical slot machines, or the like, in some implementations, many different forms or combinations of forms of game devices 100 can be included within a system, such as mobile phones or smart phone, tablets, personal computers, or the like.

In some implementations, the game device data processor 102 can take any form including a microprocessor. In some implementations, a game device data processor 102 can include a random number generator module in the form of hardware or firmware, or can execute a random number generator in the form of software. In implementations where the game device data processor 102 uses a random number generator module, in some implementations, the random number generator module can, at least in part, generate a number in random or quasi-random fashion which, in turn, can be used, at least in part, to produce a random second game outcome. In alternate implementations, the random number generator module can generate random outcomes through a central determination module (such as a Bingo draw in Class II gaming devices or a lottery draw), historical racing data, or the like. In another implementation, a system can include a server 200 which contains a random number generator in the form of hardware or firmware, or executes a random number generator program in the form of software. In some implementations, the server 200 can communicate the randomly generated number, or the random second game outcome mapped to the randomly generated number, to the game device 100 for display thereon. In some further implementations of the disclosure, a plurality of random number generators can be used. Additionally, in some implementations, one or more random number generators can select one or more probability maps, lookup tables and the like, and such selection can be based on one or more factors including, without limitation, player skill, game action events, and/or certain transition points and/or thresholds attained.

In at least one implementation, the first game and/or the second game can take the form of a software application and/or application programming interface ("API") that is executed and displayed on a game device 100. Alternatively, in some further implementations, the games can take the form of a software application and/or application programming interface ("API") that is stored on the server 200 and executed and/or displayed remotely at a game device 100. In some implementations, a game device 100 can be configured to execute a first game. For example, in some implementations, the game device 100 can be an electronic gaming machine, and a first game can be software that is installed on the game device 100. In various implementations, the first game can include a fee or can be free, but in either case, would not require a wager. However, in such implementations, a fee for the first can be collected along with a wager for the second game (as described in greater detail below), although the fee and wager can be handled separately.

In some implementations, the game device interface 104 can include one or more displays, such as a cathode ray tube ("CRT") monitor, liquid crystal display ("LCD"), organic light emitting diode ("OLED") display, plasma display, television, or the like. In some implementations, the game device data processor 102 can communicate directly or indirectly, such as through a video controller or video card, with the display of the game device interface 104.

In some implementations, the game device interface 104 can include an input device to receive input from one or more users and transmit it to the game device data processor 102. In some implementations, such an input device can take any form, such as mouse, pointer, keyboard, keypad, button panel, stylus, voice recognition hardware or software, handwriting recognition hardware or software, or the like. In further implementations, the input device can be integrated with a display in a touch screen device.

In some implementations of the disclosure, a game device interface 104 can include a device to receive wagers and/or purchases of game credits. In some implementations, this can include a physical device. For example, in some implementations, a game device interface 104 and/or game device interface 204 can include a ticket or voucher reader, bill acceptor, coin receiver, magnetic-stripe card reader, smart card reader, bar code scanner, radio frequency identification ("RFID") transceiver, radio wave receiver, transmitter, and/or transceiver (such as WiFi®, Bluetooth®, cellular, or the like), or any combination thereof. WiFi® is a registered trademark of Wi-Fi Alliance of Austin, Tex. Bluetooth® is a registered trademark of Bluetooth Sig, Inc. of Kirkland, Wash.

In some further implementations of the disclosure, the game device interface 104 can include an output device to output currency or representations of currency for awards, cash out requests, or the like. For example, in some implementations, the output device could include a ticket or voucher printer, bill or coin dispenser, card encoder, bar code printer, RFID transceiver, radio wave receiver, transmitter, and/or transceiver, or the like. It is noted that, in some implementations, devices can perform multiple functions, such as reading tickets or vouchers and accepting bills.

Figure 2:
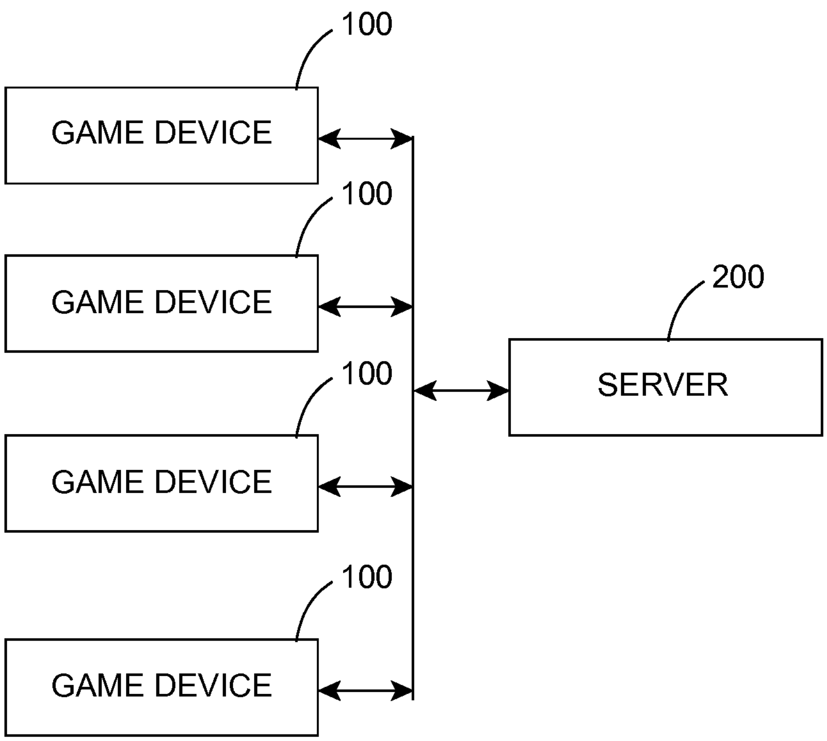
FIG. 2 is a block diagram of a system according to some implementations of the disclosure.

Some implementations include a communication device 110 that can take any form, including a modem, wired or wireless network interface card ("NIC"), or the like. Likewise, in some implementations, a communication device can use any communication method including wired or wireless signals, radio waves, light, laser, sound, image, or the like, and can communicate using any protocol, including TCP/IP, serial communication, cellular, Bluetooth®, or the like. As illustrated in FIG. 2, in some implementations, a system can include a server 200 which is in communication with the game device 100. In some implementations, the server 200 can communicate with the game device 100 via a communication device 110 at the game device 100. It some implementations, server 200 can store and execute software to produce displays at the game device 100, including by operating a random number generator at the server 200 to thereby remove the necessity for the game device 100 to include a random number generator. As may be understood, in some implementations, the server 200 can also serve to provide additional processing capacity, storage, tracking, and display for information received from game devices 100, and can likewise provide a pathway for communication among multiple networked game devices 100.

In other implementations, the game device data storage 106 can take any non-transitory form including magnetic storage, optical storage, flash storage, or the like. Some implementations include a game device data storage device 106 that can store executable program instructions executable by the game device data processors 102. For example, some implementations include a game device data storage 106 that can store executable program instructions to conduct a first game, along with executable program instructions to produce graphics, sounds, social media content, and game parameters for conducting the first game. Likewise, in some implementations, the game device data storage 106 can store executable program instructions to conduct a second game, along with executable program instructions to produce graphics, sounds, pay tables, and game parameters for conducting the second game. As suggested above, in some further implementations, a game device data storage device 106 can also store executable program instructions to generate a random number. The use of a random number combined with an interface that receives wagers and issues payouts would satisfy most legal definitions of a wagering game, game device, second device, or similar term.

In some implementations of the disclosure, the game device data storage device 106 can be local to the game device 100, remote from the game device 100, or both. For example, in some implementations, one or more game applications for either or both of the first game and/or the second game can be executed from a "cloud" of remote data storage devices 106 in communication with the game device 100 via a network or other means of communication. In some implementations, the game device 100 can, in such a cloud implementation, communicate with the application layer (e.g., such as an API) storing the first game and/or game on a continuous or periodic basis. That is, in some implementations, a game device 100 can execute a first game and/or second game by maintaining a substantially continuous or intermittent connection to the application layer of a cloud such that the first game and/or second game are not stored locally at a game device 100. Alternatively, in some further implementations, a local game device 100, and remote game device 100, or both, can download from the application layer of a cloud some or all the files necessary to execute a first game and/or game such that the first game and/or game are executed at least partially in a local computing environment.

As noted above, in an alternative implementation, a system can include a server 200. It is noted that in some implementations, the inclusion of a server 200 can be entirely optional, as certain implementations omit a server 200, and certain functions within a system including a server 200 would not require use of a server 200. In those implementations utilizing a server 200, the server 200 can be configured to perform many different functions, including, but not limited to, providing an interface, or interfacing, with a website, such as a social media website, to display and provide access to data and information gathered (whether automatically or upon receipt of a user command) from a game device 100. In some further implementations, the server 200 can also provide tracking and reward functions by storing information gathered from, or input by users at, a game device 100. For example, in at least one implementation, a server 200 can be configured to store user tracking records that store data representing each user's use of a game device 100. In some implementations, other activity can be tracked as well. For example, in some implementations, the tracking performed by the server 200 can be integrated with other forms of purchase tracking, activity tracking, or the like. For example, in some implementations, where the game device 100 is an electronic gaming machine, activity can be tracked for a user's activity at the gaming machine for purposes of rating the player in a player loyalty/reward program. In another implementation, a server 200 can perform player loyalty and/or player reward functions in which player units (sometimes referred to as "player points"), can be awarded based on the user activity tracked at the game device 100 in either or both of the first game and the second game.

In another implementation, a server 200 can also perform financial functions. For example, in some implementations, the server 200 can process, or communicate with a device that processes, financial information for the purpose of performing purchases, wagers, or the like.

In some implementations of the disclosure, the first game can include one or more game action events in the game play. It is noted that, as used herein, a game action event is not necessarily tied to the end of the first game. Rather, in some implementations, the game action event can occur at any time during the first game, including at any point at the beginning, middle, or end of the first game, or at any times or points in-between. Further, some implementations can include multiple first games, or multiple levels within a first game can be required to reach a game action event. For example, in some implementations, a game action event can be reached by a player striking a specified target in three consecutive first games, successfully completing five levels in a first game, finding a specified number of items over one or more first game levels, or the like. Similarly, in some implementations, a first game can have multiple game action events. In some implementations, a game action event can include shooting zombies, solving puzzles, winning a level, killing a boss, obtaining a special virtual object, finding treasure, hitting a bullseye, reaching a character level in the video game, etc.

Referring to FIGS. 1-4, some implementations include a method in which activity at a game device 100 during the conduct of at least one first game can result in a game action event which triggers at least one or more second games at the game device 100. Some implementations include a method in which activity at a game device 100 during the conduct of a first game can result in a game action event which triggers a second game at the game device 100. Generally stated, in some implementations, the conduct of a first game can include player input. In further implementations, the player input can require some skill, such as striking a target. In some implementations, based on the player input, a determination is made whether a game action event has occurred or has been reached in the first game. In some implementations, the game device 100 may determine whether a game action event has occurred or has been reached in the first game independent of player input. In some implementations, if a game action event has occurred, a second game can be conducted and a second game outcome can be generated. In some implementations, the second game outcome can be entirely dependent on a random number generator, and entirely independent of the first game. Understood in this manner, in some implementations, the first game can be a stage that triggers the second game, without influencing or interacting with the second game.

In some implementations, game action events do not trigger one or more second games. In some implementations, game device 100 does not include second games, but features discussed as part of the second games are features found within or are a part of the first game. For example, in some implementations, when a game action event is reached or a game action event is detected, the game device 100 may perform the process discussed in FIG. 6. In some implementations, one or more features (e.g., described in connection with the second games herein) are executed during the first game (e.g., independent of the second games). For example, in some implementations, a second game is not executed, but rather one or more game action events in the first game may cause the game device 100 to execute certain features (that are discussed herein as part of the second game) as part of the first game. Thus, it should be appreciated that any one or more of the features discussed herein as executed as part of a second game can be executed as part of the first game.

Figure 3:
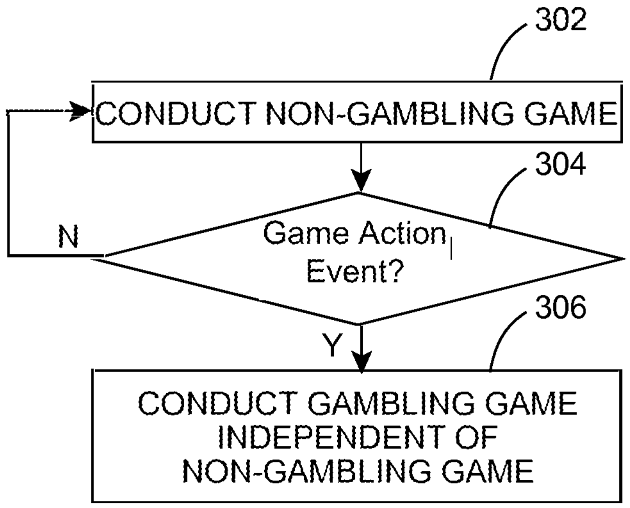
FIG. 3 is a flowchart of a method according to some implementations of the disclosure.

In some implementations, as shown in FIG. 3, the first game can be conducted 302 for a user at the game device 100. As noted above, in some implementations, the first game can be skill-based, chance-based, or a combination thereof. In another implementation, the first game can be skill-based or predominated by skill, and conduct of the game can include receipt of skill-based player input at the game device 100. As discussed above, the first game can include video games, puzzles, trivia, or other forms of skill-based games in some implementations. For example, in at least one implementation, the first game can be a video game that includes levels through which the player advances during the course of the game.

In at least one implementation, the first game can include in-game purchases. In some implementations, in-game purchases, such as items, upgrades, levels, character attributes, "power-ups," or the like, can be made through the game device 100. In at least one implementation, such purchases can be tracked and metered as a sale on a "spend meter" that is separate from any meter(s) for fees and/or wagers for playing the game (as discussed in greater detail below). In an alternate implementation, purchases can be tracked on a meter for fees collected (and possibly returned) for play of the first game (as discussed in greater detail below). In yet another implementation, purchases can be tracked (and paid for) using winnings from a second game (as discussed in greater detail below). In some implementations, such tracking can be performed by meters which always "uptick" (positively increment). Fees, returned fees and other items of value, regardless of form, can also be tracked by such metering and a player can receive real or virtual currency or awards at one or more desired times. Such currency and award receipt can be dependent on, or independent from, skill points leaderboard position, and the like.

In some implementations of the disclosure, in-game purchases can be paid for using "skill points" earned in the first game. In at least one implementation, "skill points" can be awarded based on the play of the first game. For example, in some implementations, "skill points" can be awarded based on the skill with which the first game is played using such things as accuracy, and/or speed, and/or time, and/or other objective measurements of the play of the first game. In another implementation, "skill points" can be awarded based on time on device, and/or spend (e.g., wagers and/or fees), and/or number of activations, and/or number of game action events, or the like. In yet another implementation, "skill points" can be awarded based on winnings in the second game and/or fees returned in the first game, or the like.

Additionally, or alternatively, in some implementations, "skill points" can be converted into money, credits, or the equivalent of money or credits, for play of the first game. That is, in some implementations where a fee is assessed for play of the first game and/or a wager is assessed for play of the second game (as discussed in greater detail below), skill points can be converted into money, credits, or the equivalent thereof, that can be used to pay for fees and/or wagers. In at least one implementation, such "skill points" can be carried over (such as through a player account stored in a local, server, or cloud-based database) across sessions or, alternatively, can be forfeited at the end of play. Similarly, in some implementations, "skill points" can be non-cashable, e.g., can be used for game play but not converted into cash, or can be cashable, e.g., can be cashed out of the game device 100. In some implementations, skill points can, or may not, be gifted to another player. In some implementations, the first game can always return positively, and the compensation can be tax free in some implementations as well.

In other implementations, upgrades, levels, items, character attributes, cosmetic attributes, power-ups, or the like can be earned through play of the first game. That is, in some implementations, the satisfaction of certain conditions can be associated with upgrades, completion of levels, leveling up, obtaining in-game items, altering character attributes, powering up, or the like. In some implementations, such upgrades, levels, items, character attributes, power-ups, or the like may, or may not, be gifted to other players.

As discussed above, in some implementations, the first game can include at least one game action event. In some implementations of the disclosure, while conducting the first game, the game device 100 can determine whether a game action event has occurred or has been reached. As noted above, in some implementations, the game action event can take any form. For example, in some implementations, the game action event can be reached by performing a task within the first game, reaching a goal within the first game, or otherwise achieving some level of performance within the first game. In a further or alternative implementation, game action events (or the opportunity to reach a game action event) can be obtained, at least in part, randomly. For example, in some implementations, within a video game, a game action event can include finding and obtaining a dynamic item that appears sometimes, but not all the time, with the appearance of the item determined by chance. In another implementation, concepts such as leveling, collecting, filling meters, or the like can be incorporated into the first game. In one further implementation, game action events can be coincident with reaching new levels, completing a collection, filling a meter, or the like. Additionally, or alternatively, in some implementations, game action events can occur independent of reaching new levels, completing a collection, filling a meter, or the like. In other implementations, time can be introduced as a component into the first game. As may be appreciated, in some implementations, time can be used as a measure of performance (e.g., time to finish a race, time to complete a task, or the like), and/or can be used as a deadline to create a sense of urgency (e.g., collect as many objects as possible in two minutes).

In another implementation, game action events can be dynamic in the game. For example, in at least one implementation, the appearance of certain game action events (or the likelihood of certain game action events appearing) can be based on the conduct of the first game. For example, in some implementations, the time on the game device 100, and/or number of plays of the first game, and/or number of game action events reached, and/or the skill of the player (as measured objectively through play of the first game), or the like can influence the appearance of certain game action events. Thus, in one such example directed to a shooting game, certain targets such as a spaceship, can appear dynamically based on play of the first game (e.g., after a certain period of time playing the first game, after a quantity of other targets have been shot, after a certain skill level has been attained, or the like).

In some implementations, the likelihood of certain game action events arising in a game can be variable, but independent of the conduct of the first game. For example, in a shooting game, certain targets (e.g., game action events) can have a 10% chance of appearing in a stage. Thus, over the long run, those targets will tend to appear in 10% of the stages while not appearing in 90% of the stages.

In some implementations, a prize (also referred to herein as a game fund award) can be awarded for reaching or attaining certain game action events in the first game. In some implementations, the prize can be funded from a player's game fund account (e.g., the game fund account that is discussed in greater detail below in connection with FIG. 6). In some implementations, a prize can be funded from other sources (e.g., from a progressive award account, from a game operator, from a third-party source such as an advertiser, a sponsor, another player, etc.). In at least one implementation, the prize can be awarded based on skill rather than chance. That is, in some implementations, certain game action events can result in a prize in addition to triggering the second game (as described in greater detail below). Referring to an example directed to a shooting game, striking a target (e.g., reaching the game action event associated with the target) can result in a prize independent of the outcome of the second game triggered by striking the target. In some implementations, the prize can be fixed, e.g., 50 credits, $10, or the like, variable, randomly determined (e.g., from one or more sets of prizes). In some implementations, the prize can include monetary value or one or more features for the games (e.g., weapons, healing potions, extra lives, etc.).

In some implementations, one or more game action events associated with prizes are designated as transition points. In some implementations, transition points can be associated with one or more of the game action events described herein. In some implementations, game action events can be designated as transition points for game action events that require a predetermined threshold of skill or a predetermined level of achievement. In some implementations, game action events can also be designated as transition points for game action events where the player lacks a predetermined threshold of skill or cannot meet a predetermined level of achievement. In some implementations, game action events can also be designated as transition points for game action events where the player needs a moral boost or encouragement to continue to play a game. Transition points are described in greater detail below.

Alternatively, in some further implementations, the prize can be funded from a progressive award account/progressive pool that can be built over time from multiple different players until all or a portion of the progressive pool is awarded. For example, in at least one implementation, a progressive pool can be funded by allocating a portion of a fee (described in greater detail below) assessed for conducting the first game to the progressive pool. In some implementations, the game device 100 may award a player a percentage of the pool. In some implementations, when the game action event is successfully attained, the progressive pool or a portion of the progressive pool is awarded to the player. In some implementations, "success" can be defined in any manner, e.g., speed, and/or elapsed time, and/or accuracy, and/or quantity, or any other measure through which the game action event is encountered. In some implementations, the progressive pool can be tracked by the game device 100 itself, through a server or jackpot controller communicating with the game device, manually, or in any other manner. The progressive pool can comprise operator seeding and/or a single game does not need to fund its own game-multiple games can fund the progressive pool or the progressive pool can be a universal pool or can be completely independent. In some implementations, a casino progressive pool can be used. A progressive pool includes funding from wagers from a plurality of different players. A progressive pool win is triggered from known wagering game events, such as obtaining particular symbol combinations on a payline (e.g., 7-7-7 on a three reel slot machine game). A progressive pool is not triggered separate from a wagering game being completed (e.g., "End Of Level"). When a player adds to a progressive pool, the modification to the progressive pool applies to all players. It should be appreciated, as is described in greater detail below, that a progressive pool is different and distinct from a game fund account.

In some additional or alternative implementations, certain prizes can be associated with a sequence or combination of game action events reached. Again, in some implementations, such prizes can be independent of the second games triggered by the game action events. For example, in some implementations, the prize can be based on the first game rather than a second game or some other game. For example, in some implementations, if, in the course of playing the first game, three specific game action events are successfully attained in a specific sequence or combination, a prize can be awarded by the first game. Again, in some implementations, the prize can be fixed, variable, or progressive. Likewise, in some further implementations, the combinations of game action events that result in such prizes can be fixed, variable, random, or determined by one or more algorithms. As may be appreciated, in various implementations, prizes can be funded (e.g., in a game fund account as described in FIG. 6) in any manner including an allocation of at least some of the fees assessed for play of the first game for game action events, through an allocation of wagers assessed for playing either of the first or second games, through altering the math model of the game(s) associated with the game action event.

In yet additional or alternate implementations, attaining combinations of game action events can create one or more new game action events. For example, in a shooting game, in some implementations, striking targets A, B, and C within five seconds can satisfy a new game action event such that four game action events (and four second games) occur within the sequence. That is, in some implementations, striking target A can trigger a first gambling game, striking target B can trigger a second gambling game, striking target C can trigger a third gambling game, and striking the combination of targets A, B, and C within five seconds can trigger a fourth gambling game. In some implementations, one or more of the first through fourth gambling games may also cause the game device 100 to determine one or more prizes or game fund awards.

In some implementations of the disclosure, the first game can include some elements of skill to play the game while the process of reaching game action events can be defined to include no skill at all. That is, in some implementations, any skill required to progress through the first game can be separate from the process of reaching game action events which, in one optional implementation, requires no skill at all. For example, in implementations where the first game is a shooting game, the game action event can be reached by merely pulling a trigger, regardless of whether a designated target within the first game is struck. In such an example, the trigger can be viewed as replacing the handle or "spin" button on a traditional reel slot machine. In some implementations, faster trigger pulls would merely cause the first game to reach game action events faster and result in faster gambling, e.g., each trigger pull would result in the placement of a wager, display of an event in the first game, conduct of the second game, and resolution of the wager. In another example where one or more game action events can be reached independent of player input, in some such implementations, a player's game character or avatar may move at least partially automatically or automatically (e.g., without player input) through one or more portions of a game (e.g., in a running, driving, or flying game). As the player's game character moves through one or more portions of the game, the game character may collect items, destroy items, or pass segments of the game, any one or more of which can trigger a determination of one or more game action events.

In another implementation, the skill of the player can be partially or fully negated by altering the game action event to accommodate the player. For example, in another implementation directed to a first game which is a shooting game, a target area can be designated as a game action event when the target area is "hit" by a shot in the first game. If the game device 100 detects a "hit" in the target area, the "hit" may thereby trigger a game action event. The "hit" may cause a second game to be conducted or to run the process shown in FIG. 6. In some implementations, the game device 100 may enlarge or grow the target area when the game device 100 detects one or more "misses" (e.g., shots that are near the target area, but do not strike the target area). Enlarging the target area may enable a "hit" to become more likely to occur. In another implementation, such a process can be repeated so that the target area is enlarged to such an extent that the target area occupies the entire display, thereby guaranteeing a "hit." Such an expanded target area can guarantee that a game action event will be reached regardless of the player's skill level in some implementations.

In some implementations, a first game can include solo game action events, group game action events, or both solo and group game action events. Thus, in at least one implementation, the first game can be a multi-player game. In other implementations in which the first game is a multi-player game, the players can cooperate, compete, or a combination thereof to reach game action events. In at least one implementation, game action events can require the assistance or participation by other users. For example, in at least one implementation, the first game is a social game in which at least a portion of the game play includes social interaction with other users. In at least one implementation, the assistance of, or participation by, other users can be required to reach the game action event. For example, in some implementations, different players can be provided with different tools or weapons, and a game action event can only be reached by forming a team with all the required tools or weapons to bypass the obstacles blocking the pathway to the game action event.

In additional or alternate implementations, players can compete against one another to reach game action events. For example, in at least one implementation, players can challenge one another. The result of the challenge can constitute or relate to a player reaching a game action event, e.g., a game action event can be reached when a player wins (or loses) a predetermined type or quantity of challenges.

In another implementation, players can cooperate. In at least one implementation, one or more game action events can be tasks that can only be performed when two or more players in the multi-player game cooperate, e.g., at least some game action events can be impossible to reach without the cooperation, communication, assistance, or other participation of another player in the first game. In some implementations, such cooperative participation can be simultaneous, e.g., such as a task of reaching an object that cannot be reached by either player alone, sequential, e.g., such as a task of one player finding an object then telling another player how to retrieve it, a combination of simultaneous and sequential cooperation, or time-independent.

In a further implementation, the task can require cooperative, yet competitive, participation by multiple players. For example, in some implementations, a task of demolishing a building can require multiple players to accomplish, but if only one of the players can reach the game action event, the players can compete, for example, to fire the final shot that demolishes the building.

In some implementations that include cooperative play, multiple game devices 100 can share a single display or group of displays. For example, in some implementations, a "team" of players can each assigned a game device 100, but the game devices 100 all communicate with a single, large format display. In some implementations, while conducting the first game, player activity for all the game devices can be displayed on the shared display.

In another implementation, a task can require cooperation, but the cooperation may not necessarily be coordinated. For example, in some implementations, a task can require players to solve a puzzle with separate players solving separate pieces of the puzzle so that a player is only responsible for his or her puzzle segment and is neither helped nor hindered by other players. It is noted that in such an optional implementation, time may not be a factor insofar as the puzzle segments can occur simultaneously, sequentially, or independent of time (e.g., each player solves a segment as it is encountered in the game).

In another implementation, the first game can involve some physical or purely mental activity. For example, some implementations can include hitting a golf ball or baseball, shooting a basketball, throwing darts, or other physical activity can be a component of the first game. In some implementations, the physical activity can be sensed by the game device conducting the first game through any means, including a pressure pad, and/or physical sensors, and/or electromagnetic sensors (e.g., using infrared, and/or light, and/or ultrasound, and/or microwave, and/or radar, or other electromagnetic radiation), and/or optical sensors, or the like. As above, in some implementations, a first game involving physical activity can include a game action event that is reached through the physical activity.

In any of the implementations described above, reaching a game action event may not necessarily be a final outcome. In some implementations, a game action event is not necessarily a "winning" outcome or a "losing" outcome, although it could be tied to either a winning outcome or a losing outcome, and can be independent of winning or losing the first game. For example, in some implementations, a user can reach or trigger a game action event for completing a task or finding an item within a first game, regardless of whether the end result of the first game is a "win" or a "loss." In another implementation, the game action event can be specifically tied to one or more wins or losses.

In some implementations, when a game action event is reached 304 during the first game, a second game can be triggered. In at least one implementation, the second game can be initiated immediately at the same game device 100. In some further implementations, the initiation of the second game can be caused directly by reaching a game action event in the first game or, alternatively, a signal can be generated when a game action event is detected, and the second game can be initiated in response to the signal. In another implementation, the transition between the first game and the second game can occur by replacing the display of the first game with the display of the second game. In some implementations, the display replacement can occur in any fashion and using any effect, such as a cross-fade, a pixeling-out transition, an overlay, or the like. In some implementations, the first game and the second game can be joined seamlessly, thereby presenting a single game experience that includes features of a first game and a second game. For example, in one such example implementation, a bonus round of a second game can be integrated into the action of a first game by presenting screen in which input is received to select objects having a monetary value (as is common in gambling game bonuses) that is themed to match the first game. In this manner, in some implementations, it would appear to the player that the selection of bonus objects in the second game is part of, or a stage in, the first game.

In an alternate implementation, the first game can remain displayed, with the second game displayed in a separate window or area, such as through a picture-in-picture effect, split screen effect, multi-screen effect, or the like. Further, in some implementations, the displays can allow for movement or animation across different windows or areas in which the first game and second game are displayed, thereby allowing for visual interaction between the games, even though the games are conducted independently. In further implementations of the disclosure, a game device 100 can include multiple displays, and the first game and second game can be displayed in different displays, or together across multiple displays. Again, in some implementations, the multiple displays can be independent or can be integrated to allow multi-screen objects and multi-screen movement between displays.

In other implementations of the disclosure, the second game can be triggered for play at a different game device 100 or at a different time. In one such implementation, a server 200 can store the fact of the triggering of the second game. In some implementations, by "storing" the fact that the game action event has been reached or triggered, and a second game has been triggered, a server 200 can store data in a database of users and/or game devices 100 that associates the user and/or game device 100 with the game action event and/or data representing the game action event. In at least one implementation, a database can identify users and/or game devices 100 in any manner, including by user name, device number (such as mobile telephone number, IMEI number, IMSI number, MAC or network address, or the like), IP address, account number, social media account, or other identifier. In some implementations, when a game device 100 receives input identifying a record at the database stored at the server, the second games that have been triggered for play at the game device 100 can be determined from the database.

In another implementation of the disclosure, the device conducting the second game and the device conducting the first game can be modular. For example, in at least one implementation, a second game module can dock with a first game device, or vice versa (a first game module can dock with a second game device). In some implementations, when docked, the second game can occur on the second game module and the first game occurs on the first game device (or vice versa).

In some implementations, a game device 100 can conduct 306 a second game in response to reaching a game action event in a first game. In another implementation, the game device 100 conducting the second game can be a casino game device, such as an electronic gaming machine, electronic table game, or the like.

In a further implementation, a single game device 100 can conduct the first game and second game. In another implementation, separate game devices 100 can conduct a first game and the second game. For example, in at least one implementation, the game device 100 conducting the first game can be an arcade game and the game device 100 conducting the second game can be an electronic gaming machine, electronic table game, or the like.

In some implementations, when the first game and second game are conducted on separate game devices 100, a game device 100 conducting the first game can communicate with a server 200. More specifically, in some implementations, the server 200 can receive a communication from the game device 100 conducting the first game identifying a game action event that was reached at the game device 100. In some implementations, the server 200 can then make that available to a game device 100 configured to conduct a second game, such that the server 200 that can act as an intermediary between game devices 100. It some implementations, the transfer can occur more or less in real time, or the transfer can be delayed, with the server 200 storing the data identifying the game action event for at least some time.

In some implementations, the server 200 can be part of, or configured for communication with, a player tracking and/or player loyalty system operating in connection with one or more game operators. In some such implementations, a server 200 or game device 100 can utilize the player database to store records of a game action event reached during first games. In some implementations, the game action event can be accessed by the user at a game device 100 in communication with the player tracking and/or player loyalty system. For example, in at least one implementation, the user can identify himself or herself at the game device 100 using an encoded card, personal identification number ("PIN"), user number or identifier, radio frequency identification ("RFID") transponder, mobile device, or other means for identifying and/or authenticating the user to the game device 100. In some implementations, after being identified, the second game triggered by the game action event can be conducted for the player at the game device 100.

In another example implementation, a server 200 can be part of, or configured for communication with, a social network site. In some such optional implementations, a server 200 can utilize the user database to store records of a game action events in the social network profile for the user. In some implementations, the game action event can be accessed at a game device 100 which communicates with the social network. For example, in some implementations, the game device 100 can communicate via the world wide web, virtual private network ("VPN"), local area network ("LAN"), wide area network ("WAN"), mobile broadband, WiFi®, or the like with the social network. Optionally, in some implementations, the user's identity can be transmitted, such as through a username and password, biometrics, caller ID, automatic number identification ("ANI"), account number, IP address, or other identifying data, to access the correct profile on the social network. In some implementations, after being identified, the second game can be triggered by the game action event, and can be conducted for the player at the game device 100.

In some implementations, the game device 100 can conduct the second game. In an optional implementation, the second game can be conducted logically independent of the first game. That is, in such implementations, the outcome of the second game can be entirely determined based on a random number generated during the second game, and is entirely independent of the conduct of the first game. For example, in some implementations, the second game can be a wagering game of any format, such as a reel slot game, live or electronic card game, video poker game, blackjack game, roulette game, keno or other numbers game, baccarat game, lottery game, pull-tab game, or any other game in which a mandatory wager is received 400 from a user (such as through a game device interface 202), with the wager staked on the second game outcome. In some implementations, when the second game is conducted, it is conducted solely based on the rules of the second game and a randomly generated number 406, as if the sole role of the first game was to trigger the game with no interaction between the first game and second game. Thus, in some implementations, the second game outcome is determined 408 solely based on the random number generator ("RNG"). More specifically, in some implementations, the wager staked on the second game is resolved based on the second game outcome. In one such optional implementation, the second game can be determined entirely or predominantly based on chance, e.g., a random event, and can result in either a loss, in which case the wager is collected, or a win, in which case a payout is issued 410. In some implementations, certain second games can also include pushes or ties, in which case the wager is returned in some implementations. It should be noted that certain second games triggered by the first game can be wager-free, e.g., free spins. For example, in some implementations, certain game action events can trigger a second game that does not require a wager because, for example, of the difficulty in reaching/attaining the game action event.

In at least one implementation, the second game can be generated after the game action event is reached. Thus, in such an implementation, a handoff can occur in which the game device 100 conducts a first game, and then generates and conducts a second game when a game action event is reached. Optionally, in some implementations, the game device 100 can return to the first game after the second game outcome is generated.

In another implementation, the second game outcomes can be generated prior to, or simultaneous with, the conduct of the first game. Thus, in at least one implementation, a set of second game outcomes can be generated and stored at the game device 100. As game action events are reached, the pre-generated second game outcome can be selected, either in a predefined manner or randomly. In one such example, a set of three second game outcomes can be generated in the form of a minor win, a loss, and a major win. In some implementations, as each of three game action events are reached, the pre-generated second game outcomes can be utilized. In one example, the second game outcomes could be utilized serially (e.g., minor win, loss, minor win) as the game action events are reached serially. In another example, a second game outcome could be randomly selected from the set as the game action events are reached (e.g., the second game outcomes could be selected "out of order"). In a variation on such an implementation, the set of second game outcomes can be larger than the quantity of game action events in the first game. In one such non-limiting example, a set of ten second game outcomes can be pre-generated, with three of the second game outcomes selected as each of three game action events are reached. In some implementations, the second game outcomes may be generated independent of a random number generator. For example, in some implementations, the second game outcomes can be based on one or more non-gambling or skill based games.

In another implementation of the disclosure, second game outcomes can be generated simultaneously with the conduct of the first game, such that the second game and first game can be conducted more-or-less simultaneously. In one such optional implementation, game action events can merely serve to select the second game outcome that was generated at the time the game action event was reached. For example, in some implementations, twelve second game outcomes can be generated during the course of a first game, but since game action events are reached when the fourth, seventh, and eighth second game outcomes are generated, only the fourth, seventh, and eighth second game outcomes can be used to resolve the wager.

In some implementations, the second game can be shown at a display. For example, in some implementations, striking a specified target can be a game action event, which causes the game device 100 to generate and display a reel slot game that was triggered by the game action event. In some implementations, the outcome of the second game can then be generated (again, independent of the first game and based solely on a randomly generated number) and displayed in the form of reel slot symbols lying along pay lines. In some implementations, the second game of such an optional implementation can replace the display of the first game (e.g., the first game is paused while the second game supplants the first game at the display), or the second game can be displayed on a secondary display at the game device 100 (e.g., the game device 100 includes two separate displays, one of which shows the first game while the other shows the second game), or the second game can be displayed in a window on the same display as the first game (e.g., the game device 100 include a single display, which shows the first game and second game in separate windows).

Alternatively, in some implementations, the second game is not displayed at the game device 100. Rather, in some implementations, striking a specified target can be a game action event which causes the game device 100 to conduct a reel slot game (or other suitable random number generator based game) internally, with only the second game outcome displayed in the form of the award for the wager. Some implementations can provide the illusion that striking the specified target resulted in an award, while in reality, striking the specified target triggered a second game which resulted in an award.

It should be further noted that a game action event can lead to different second games depending on the first game in which the game action event is received. For example, certain first games can be associated with second games with a higher hit frequency, but lower payouts, while other first games can be associated with second games with a lower hit frequency, but higher payouts.

Similarly, in some implementations, the first game can include multiple game action events with different game action events associated with second games that can differ in their mathematical model. For example, in some implementations, certain game action events can be associated with mathematical models with a higher payback percentage (or the like) while other game action events can be associated with mathematical models with a lower payback percentage (or the like). In one such non-limiting example, the mathematical model associated with the second game at each game action event can be determined in a random or weighted random manner. Thus, in one such example, as each game action event is reached, a random process is conducted to determine the mathematical model associated with the second game conducted in response to that game action event. In some implementations, after the mathematical model is randomly determined, the second game can be conducted and an outcome can be generated. More concretely, in one example, a game action event could have a 20% probability of leading to a second game with a 97% payback model, a 30% probability of leading to a second game with a 95% payback model, and a 50% probability of leading to a second game with a 92% payback model. In some implementations, a random draw can occur when that game action event is encountered to determine which of the mathematical models will apply to the second game to be conducted. In one example, the 92% payback model can be selected by the random draw, which leads to the conduct of a second game with a 92% payback model.

In another example, game action events can each be associated with a second game with a fixed mathematical model, where the mathematical model can vary based on the particular game action event. For example, in a first game in which game action events are represented by targets, certain targets (for example, aircraft carriers) can be associated with a second game with one mathematical model (for example, 99% payback), while other targets (for example, submarines) can be associated with a second game with a different mathematical model (for example, 95% payback). In some implementations, the mathematical model can be adjusted by increasing or decreasing the hit frequency (e.g., the ratio of winning outcomes to losing outcomes), by adjusting the pay table (e.g., the amount paid for winning and/or losing outcomes), or any other manner understood in the art.

Figure 4:
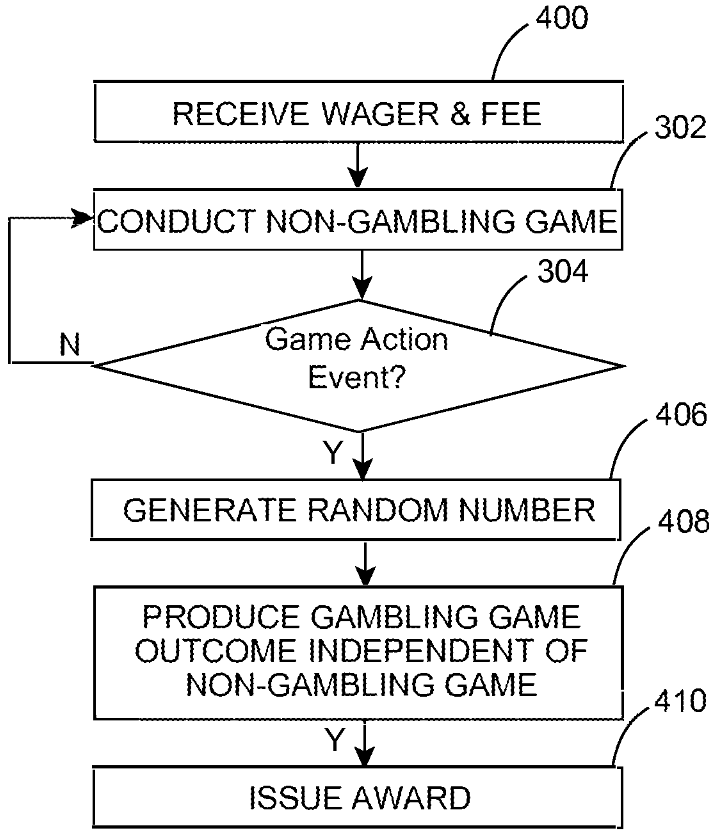
FIG. 4 is a flowchart of a method according to some implementations of the disclosure.

Additionally, as illustrated in FIG. 4, in some implementations, the nature of the payouts and awards can be structured so that the game device 100 always returns something by appropriately structuring the fees and wagers. For example, in at least one implementation, the game device can utilize a mathematical model in which one or more outcomes in the second game, whether winning or losing outcomes, are paid or result in prizes. For example, in at least one implementation, a pay table can be defined for a second game in which the lowest payout is four credits. In some implementations, in a second game in which the wager is ten credits, the house can collect six credits when a game action event is triggered, while the player will receive at least four credits (possibly more, if the second game outcome is a winning outcome) when a game action event is triggered.

In another example, in some implementations, the game device 100 can return the fee (or a portion of the fee) associated with the first game to the player, while any payout associated with the wager can be determined by the second game. Thus, in such implementations, the game device 100 can also return something. For example, in some implementations, a game device 100 can receive $5.00, with $1.00 allocated to a fee for the first game and $4.00 allocated to a wager on the second game. In some implementations, when a game action event is reached in the first game, a second game can be conducted with $4.00 staked on the outcome. In some implementations, if the outcome of the second game is a losing outcome, the payout would be $0.00 from the second game (although, as mentioned above, in alternate optional implementations, losing outcomes could also result in a payout). However, in some implementations, if the $1.00 fee was allocated with $0.60 allocated to a retained fee and $0.40 to a return fee, the game device 100 would issue a total payout of $0.40. Thus, in this example, $4.00 was lost on the second game, $0.60 was assessed as a fee for the first game, and $0.40 was returned to the player. Alternatively, in some implementations, if the second game resulted in an outcome associated with a payout of three times the wager, the payout from the second game would be $12.00. Again, in some implementations, if the $1.00 fee was allocated with $0.60 to a retained fee and $0.40 to a return fee, the game device 100 would award a total payout of $12.40 (e.g., $12.00 won from the second game plus $0.40 returned from the first game, with $0.60 assessed as a fee for the first game). In some implementations, the entire fee can be returnable, with no retained fee for the first game. Thus, in the example above, conduct of the game can always result in a return of at least $1.00, with any additional return being based on a $4.00 wager on the second game. In some implementations, such a system would provide a game that always pays something. Alternatively, in some implementations, the entire fee could be retained, with none of the fee returned to the player. In such a system, only the win from the second game would be paid to the player. In some implementations, a casino or other operator cannot change the fee percentages and payouts of the games, ensuring the games are not overly "tightened." In other implementations, the percentages and payouts can be fully adjusted. In some implementations, as is discussed below in connection with FIG. 6 and FIG. 8A, a return fee can be stored and returned to a player during the first game or in a later play of the first game. In some implementations, multiple return fees can be built up over one or more plays of a game (or one or more plays of different games) to provide a larger return fee/prize/game fund award. In some implementations, the return fees/prizes/game fund awards can be provided when the game device 100 determines that a transition point has been trigger or has been reached.

The amounts allocated between wagers and fees (e.g., game fund portions or return fees) can vary in some implementations. For example, in some implementations, a portion or the entire fee obtained for a game action event can be returned to the player to provide some positive feedback at one or more game action events. In an alternate implementation, the game device 100 may determine not to assess a return fee (or a game fund portion), and the entire amount debited at a game action event game action event can be allocated to a wager.

In some implementations, the allocation between wagers and fees (including return fees or game fund portions) can be determined based on the first game (e.g., the first game's pace, difficulty, speed, or the like). In another implementation, the ratio between the wagers and fees can be set by the casino operator and/or game designer. For example, in some implementations, a lower-fee/no-fee game (or a higher-wager/all-wager game) can feel more like a slot machine in both time-on-device and expected value to the player. In yet another implementation, the ratio between the wagers and fees can be set by the player. For example, an "Easy" setting can allocate more to the return fee than the wager, e.g., 60% to the return fee and 40% to the wager, as compared to a "Difficult" setting which allocates more to the wager than the return fee, e.g., 40% to the return fee and 60% to the wager. In such implementations, over the course of an equal number of game action events, the "Easy" setting can tend to keep the player in the game by returning fees to the player, although the player can simultaneously be wagering less and, presumably, be eligible for lower payouts in the second game. Conversely, the "Difficult" setting can tend to be more volatile insofar as the player is wagering more and, presumably, is eligible for greater payouts in the second game.

Similarly, in at least one implementation, the percentage of fees returned (e.g., prizes/game fund awards) by the first game and payback percentage of the second game can be adjustable. For example, in at least one implementation, the overall return (e.g., fee return percentage and payback percentage) can be constant, but the relative ratio between the two can be altered based on the skill of the player. In at least one implementation, a determination can be made by the game device 100 of the skill level of the player. In at least one implementation, the determination can be made through play of the first game or, additionally or alternatively, through a pre-game calibration stage. In at least one implementation, lower skill levels can be associated with an increased fee return percentage and a lower payback percentage. Such a setting can provide a steady stream of fees returned, but with lower likelihood of winning outcomes in the second game. In some implementations, this can make the overall return seem less volatile (although the game volatility can be substantially fixed). In the same optional implementation, higher skill levels can be associated with an increased payback percentage and a lower fee return percentage. In some implementations, such a setting can provide a smaller trickle of fees returned, but with a higher likelihood of a winning outcome in the second game. In some implementations, this can make the overall return seem more volatile (although the game volatility can be substantially fixed). In some implementations, it is noted that a substantially equivalent effect can be created by adjusting the amount of fees returned in the first game and the size of the payouts in the second game based on the skill level of the player. Thus, in at least one implementation, lower skill levels can have a higher percentage of the fees returned by the first game and smaller payouts associated with the second game, while higher skill levels can have a lower percentage of the fees returned by the first game and larger payouts associated with the second game.

In some implementations, the first game can only affect the display of the game, without affecting the conduct or structure of the underlying second game. For example, in at least one implementation, the first game (or the player input received during the first game) may not affect the odds of winning the second game, the payout, the payback percentage, the hold, the expected value or return, or other metric by which the second game is measured.

However, in another implementation, different game action events in the first game can be associated with different fees and/or mathematical models for second games. For example, in at least one implementation directed to a shooting game, different targets can be associated with a different fee. In at least one implementation, the ratio of fee to wager can be randomly determined as each target is hit (e.g., as each game action event is encountered or triggered). For example, in some implementations, a random process can determine that, of the $1.00 debited at a first target, $0.10 will be allocated to a fee that is returned to the player and $0.90 will be exposed to the second game as a wager. Thus, in some implementations, when the first target is hit, a payment of $0.10 plus any win from the second game based on the $0.90 wager would be issued to the player. Continuing with the example, a random process can determine that at a second target, a $1.00 debit will be allocated with $0.40 to a fee that is subsequently returned to the player and $0.60 will be exposed to the second game as a wager. Thus, when the second target is hit, a payment of $0.40 plus any win from the second game based on the $0.60 wager would be issued to the player. It should also be appreciated that in some implementations, the $0.10 fee that is returned to the player or the $0.40 fee that is returned to the player could be stored and returned to the player during the play of the game or during a play of some subsequent game. In some implementations, the $0.10 fee that is returned to the player or the $0.40 fee that is returned to the player can be combined with other return fees and returned to the play as one or more aggregate amounts.

In some implementations, in addition to, or in place of, a return fee, a player can be rewarded based on the first game independent of the outcome of the second game. For example, in at least one implementation, certain tasks within the first game can require skill to accomplish. In at least one implementation, an award can be issued based on the skill with which the task is accomplished. In at least one implementation, the award can be based on a predefined schedule of outcomes. For example, in a target shooting game, an award can be issued based on, for example, one or more of: the number of targets hit, the speed with which targets are hit, the number of targets hit within a particular time span, the accuracy with which targets are hit, or any other measure. In another implementation, some randomization can be introduced by using the skill to determine a reward level, but determining the exact amount of the award within that reward level in a random or weighted random manner. In one such implementation, for example, a multi-dimensional pay table can be generated, with the skill level determining one coordinate of the award in the pay table, and a random process (such as a random number generator) determining the second coordinate of the award in the pay table.

In yet another implementation, the return fee (or the game fund portion) can be fixed for any particular game action event. For example, in a first game directed to target shooting, hitting certain targets (e.g., a game action event) can be assigned a split of 50% to a return fee and 50% to a wager, while other targets can be assigned a split of 25% to a return fee and 75% to a wager. Thus, in one example implementation, a debit of $1.00 can be allocated with a split of $0.50 as a wager and $0.50 as a fee for blue targets, while a debit of $1.00 can be allocated with a split of $0.75 as a wager and $0.25 as a fee for red targets.

In another example implementation, the user can be permitted to input an election regarding the triggering of a second game upon reaching a game action event. For example, in at least one implementation, the game device 100 can receive input to select the specific first game to conduct upon reaching a game action event. Thus, in at least one implementation, a game device 100 can generate a menu of second game selections at a game action event and receive input selecting one or more of the second games presented in the menu. In some implementations, the game device 100 then conducts the second game(s) in response to the selection received.

In some further implementations, a user may not be provided with any selection regarding the triggering of a second game upon reaching a game action event. For example, the second game can be immediately conducted at the game device 100, without any selection from the user, with the second game either displayed or hidden from the player. In an implementation in which the second game is hidden from the player, the illusion would be created that the first game is conducted without interruption, with payouts being received at the various game action events seamlessly and automatically.

In some further implementations of the disclosure, the user may, or may not, be informed of the location or results that occur in the second game at any specific game action events. Rather, in some implementations, a player can play an entire level, passing through one or more game action events at which second games occurred outside the view of the player, with the overall outcome only displayed at the end of the level. For example, $20.00 can be received for a first game that includes three game action events, with $5.00 wagered on each second game triggered at the three game action events, and $5.00 received as a return fee that is not exposed to loss through the second game. In some implementations, as the first game is conducted, the game action events are encountered (such as by hitting one or more specified targets), and one or more second games are conducted to produce a second game outcome at teach game action event. In one example implementation, the results are not provided at each game action event, but rather presented at the end of the level. Thus, in one example, the end of the level can end in an award of $15.00 from the initial $20.00. Again, outwardly, it would appear to the player that he or she won $15.00 for playing a level of the first game. However, internally, the game device 100 would have conducted three second games, each based on a $5.00 wager, with two second games resulting in losses and one second game resulting in a $10.00 payout. Further, combining the $10.00 payout with the $5.00 return fee (which was never exposed to loss through the second game), an overall award of $15.00 would be paid. In some implementations, the first and/or second game may include side bets. Such side bets can be prompted and executed by one or more displays. In some implementations, a winning player may receive a percentage of the award and the percentage may range to one hundred percent.

In another implementation of the disclosure, a portion of the money received can be allocated to a pool that is resolved among multiple players of the first game and/or the second game. For example, in one such optional implementation, $15.00 can be received, with $5.00 wagered on the second game (e.g., exposed to loss in the second game), $5.00 contributed to a pool to be distributed to one or more "winners" of the first game, and $5.00 received as a return fee (e.g., not exposed to loss in the second game). In some implementations, at the end of the first game, one or more winners can be determined from multiple players and awarded the pool (optionally after subtracting a fee). Thus, for example, in a first game with ten players each contributing $5.00, the pool can contain $50.00. In some implementations, at the end of the first game, a first-place winner can be awarded $20.00, a second-place winner can be awarded $15.00, and a third-place winner can be awarded $10.00, with $5.00 raked from the pool by the game operator. As discussed above, in some implementations, the portion of the amount staked on the outcome of the second game can be resolved based on the outcome of the second game, and the portion of the amount that was received as a return fee can be returned in whole.

In some implementations, one or more meters can be maintained for different aspects of the collection of value and the use of value during game play at the game device 100. One or more of the meters can be an internal meter used for auditing that is not displayed to a player (e.g., a coin in meter, a coin out meter) and one or more of the meters can be a meter that is displayed to a player for information relevant to player about the game and/or one or more of the player's accounts. In some implementations, one or more of the meters displayed to the player on a gaming device display can correspond to an internal meter used for auditing.

In a non-limiting example implementation using meters, the game device 100 may include, but is not limited to, a coin-in meter (also known as a money played meter), a coin-out meter (also known as a money out meter), a player's credit meter, and a player's game fund account meter. In some implementations, the coin-in meter/money played meter may represent aggregate of the value added to a game device 100 from one or more players. In some implementations, the coin-out meter/money out meter can track aggregate winnings paid out to one or more players at the game device 100. In some implementations, the coin-in and coin-out meters can be internal meters not displayed to players and can be used as part of an audit of revenue earned by the game device 100. In some implementations, a player's credit meter is a representation of what one player added to the game device 100 and/or won at the game device 100. In some implementations, the player's credit meter is displayed to the player at the game device 100. In some implementations, the game fund account meter tracks return fees/game fund portions that are stored for the player. In some implementations, the game device 100 may increment the game fund account meter when return fees or game fund awards are obtained from a game action fee. In some implementations, the game device 100 may decrement the game fund account meter when paying the player prizes/game fund awards from the game fund account. In some implementations, the game device 100 may increment the player's credit meter when the game device 100 pays the player a prize/game fund award from the game fund account meter and also may increment the coin-out meter when the game device 100 pays the player the prize/game fund award. It should be appreciated that a game device 100 can be configured with any suitable meters to track various aspects of a player's activities as well as aggregate activities at the game device 100.

In some implementations, meters tracking activities related to game action events and transition points can be used as a new way to validate or otherwise verify a typical audit (such as a coin-in minus coin-out audit). For example, in some implementations, the game device 100 may include a coin-in meter, a coin-out meter, a player credit meter, a wagers made meter, a wagers won meter, a game fund account increment meter, and a game fund payout meter. In some implementations, the coin-in meter, coin-out meter, and player credit meter serve the same purpose previously discussed. In some implementations, the wagers made meter may track aggregate wagers made at the game device 100. In some implementations, the wagers won meter, may track aggregate winnings paid out to players based on wagering events (e.g., wagers made during game action events, wagers made during transition points, and other suitable wagering events, etc.). In some implementations, the game fund account increment meter may track return fees or game fund portions determined during game action events for a player. In some implementations, the game fund payout meter may track prizes/game fund awards issued to the player during transition points. In some implementations, the wagers made meter, wagers won meter, game fund account increment meter, and game fund payout meter can be used as a separate, but parallel tracking system to determine aggregate revenue at a game device 100 (e.g., in addition to a coin-in minus coin-out determination). For example, an audit verification may comprise confirming that:

(coin-in meter)−(coin-out meter)=(wagers made meter-wagers won meter)+(game fund account increment meter−game fun payout meter)

In some implementations, if the above formula is not logically true, then the game device 100 (or another suitable device) can determine that an error has been made either tracking the coin-in/coin-out or tracking the game action events and transition points activities.

In some implementations, a first game can be configured with game action events with the first game having a defined end or an indefinite end. For example, in some implementations, a first game can be conducted in discrete segments, such as levels, with each segment requiring a predefined or a dynamically calculated amount of fees plus wagers. Alternatively, in some further implementations, a first game can be conducted in an open-ended manner, with the first game continuing until the deposited fees plus wagers are exhausted or the player chooses to cease playing.

In some implementations of the disclosure, the first game can include multiple game action events. In some implementations, the multiple game action events can be fixed, random, or dynamically determined using one or more algorithms. For example, in some implementations, a first game can include shooting a set of targets, a fixed number of which are game action events that trigger a second game. In another example implementation, a first game can include shooting a set of targets, a random number of which are game action events that can trigger a second game. In some implementations, the game device 100 may determine that a player prefers a low wager and volatility game. In some implementations, based on the determination of the player preference, the game device 100 can dynamically determine fewer game action events (e.g., associated with low wagers and return to player) in a game so that less money is deducted from the player during the game. In another example, in some implementations, a centralized controller (e.g., a remote server or a networked game device 100) for a bank of gaming devices 100 may dynamically determine that catching a particular fish is a game action event. In some implementations, the centralized controller may enable the players at the bank of gaming devices 100 to vote to select the particular fish that triggers a game action event. In some implementations, centralized controller may determine the particular fish based on the frequency of the player's wager, the time of day, etc. In some implementations, the dynamic determination of the particular fish may include determining how many different fish as are designated as triggering a game action event when caught.

In a further implementation of the disclosure, the second game can relate to or be associated with the game action event. For example, in some implementations, the second game associated with a small target can have a higher pay table or greater hit frequency than the second game associated with a large target. Thus, in some implementations, although input in the first game does not affect the conduct of the second game, input in the first game can determine which second game is conducted.

In yet another implementation of the disclosure, a single second game can be associated with all the game action events in a first game (e.g., with one or more different executions of the second game), but the game action event(s) can be used to select the payout level of the second game. For example, in some implementations, a small target can be associated with a higher payout level than a large target. However, in some implementations, the second game outcome can still be randomly determined independent of the first game. In other words, in some implementations, if the random number generation within the second game produces a second game outcome that is a "winning" outcome, a game action event associated with a small target can result in a payout that is larger than a game action event associated with a large target. Thus, in at least one implementation, different game action events can enable different fixed or progressive awards within the second game.

In a further implementation of the disclosure, the probability distribution of outcomes within the second game can be associated with game action events. For example, in some implementations, a small target can be associated with a distribution of outcomes that is more likely to produce a "winning" second game outcome than a large target. Again, in some implementations, the second game outcome can still be randomly determined independent of the first game. However, in some implementations, a winning second game outcome can have different probabilities of being generated based on the game action event.

In another implementation of the disclosure, the second game outcome can dynamically alter the first game. For example, in some implementations, certain second game outcomes can alter or enhance the fees returned and/or create, alter, or enhance a skill-based prize that is awarded as a result of the play of the first game. In some implementations, separate from any skill prizes associated with transition points, the first game can include side bets that are resolved based on the skill of the player. In at least one implementation, the player can, for example, place a proposition wager that, if satisfied, can result in a payout to the player. In such implementations, the proposition can be satisfied by the skill with which the player plays the first game. In some implementations, such propositions could be resolved based on any objective measure, such as time, speed, accuracy, quantity, or the like. In at least one implementation of the disclosure, the proposition can only have a winning or losing outcome in which the skill side bet is paid or collected, respectively. For example, in some implementations, if the proposition is to complete a series of tasks within thirty seconds, the skill side bet can be paid if the tasks are completed within thirty seconds and collected if the tasks are not completed within thirty seconds. Alternatively, in some implementations, the proposition can be associated with a pay table. For example, in some implementations, if the proposition is to complete a series of tasks within thirty seconds, completing the tasks in fewer than twenty seconds can result in a higher payout than completing the tasks within twenty-one to thirty seconds.

As discussed earlier, in some implementations, the game device 100 can be an electronic gaming machine, and activity can be tracked for a user's activity at the gaming machine for purposes of rating the player in a player loyalty/reward program. In another implementation of the disclosure, a server 200 can perform player loyalty and/or player reward functions in which player units (e.g., "player points"), can be awarded based on the user activity tracked at the game device 100 in either or both of the first game and the second game.

In some implementations of the disclosure, the system can enable bounties to be established or set on one or more players. For example, in some implementations, the top five, ten, fifteen, or twenty players in a game can be labeled with a bounty for incentive reasons. In some implementations, other players can eliminate these players rather than a player who just joined or has a low elimination score. In one non-limiting implementation, a bounty can be established to eliminate a top five player, where the player eliminating the top five player can receive extra elimination points, and/or more multipliers on the players skill points, and/or elimination count, and/or multiplier on wager/bet per elimination, and/or other bonus features. In a further non-limiting example implementation, when a player eliminates a third best player, until the player is eliminated, the players multiplier is a 3× multiplier, a 0.3 multiplier for skill points in game or money/bet return on an RNG gambling side gambling outcome.

In some further implementations, in other possible games and outcomes, the more eliminations the player has, the more the multiplier increases. For example, for 115 eliminations, the multiplier is in the 11.5 or 1.15 range. In some implementations, the system can include leaderboards based on money made throughout skilled actions or rotating due to time, (e.g., leaderboards reset at say 8 pm every day or on Friday every week).

In some implementations, loot boxes can be implemented by the system as an incentive to log on daily, or on a certain day, or weekly, which in one non-limiting implementation can create a targeted influx of players, or possibly event, tournament, either from player tracking encrypted accounts, or for a daily login from casino host servers, (e.g., as a closed loop system). In some implementations, this can give players a reason to come back day after day. In some implementations, this can be used in a variety of game genres, including, but not limited to "BRG" games, role-playing games ("RPG"), real-time strategy "RTS" games, first-person shooter "FPS" games, multiplayer online battle arena "MOBA" games, massively multiplayer online "MMO" games, rail games, arcade games, and can work for any game genre.

In some implementations, the loot box rewards can be paid out of a skill side of the system via an accumulating money pool. In some further implementations, loot boxes or daily/login rewards of that same format can be used to pay in different ways other than money, such as an extra life on turn, a spawn in advantage point on a game map, or anything that can give a slight edge to the skill side that isn't too drastic on game play, but provides an incentive to log on, or go to casino and play that game on that certain day or time, or any desired time.

In some implementations, a portion, sequence, stage, or step of the first or the second game can comprise gambling on a live and/or actual event, whether presented in real time or at a later time or date (hereinafter referred to as an "event.") In some implementations, a game action event can comprise an outcome, status, or stage of an event. For example, in some implementations, a wager and a game fee (which must be greater than zero) can be received through a gaming device interface from the input, where the first game can include a video feed of an event with at least one game action event defined in one or more ways by the system, and at least one outcome at any time of the event which is random or based on chance or probabilities. In some implementations, the game action event can comprise an outcome status, or stage of an event signaling initiation of the second game or some other stage of the second game, where the second game utilizes a random number generator module to generate a gambling game outcome independent of the first game.

In some implementations of the disclosure, the event can comprise any game, sporting event or other event involving an animal and/or human (e.g., such as a horse race, football game, Esports event, etc.). Some implementations include a server and/or servers that may host all Esports games. In some implementations, the player can proportion a wager and/or fee to an outcome, status, stage, or occurrence of the live or real event, such as a winner of the horse race, football game, Esports event, etc. In some implementations, the player is not aware of any wager and/or fee that has been bet upon their outcome, status, stage, or occurrences. In some implementations, many players can bet on one player's outcome, status, stage, or occurrence (e.g., inline betting), setting up a spectator type of betting event. In some implementations, the player that bet the wager and/or fee may return to receive their winning award and/or be notified of their loss.

In some further implementations, the live or real event can comprise a gaming tournament such as an online gaming platform where a player can proportion a wager and/or fee to an outcome, status, stage, or occurrence of one or more live games. For example, in some implementations, the player can place a wager and/or fee on a gamer or team of gamers winning a game, reaching a level of a game, causing or being part of an event in the game, etc.

In some implementations, at least a portion of the event can be displayed to a player in real time or near real time as part of the first game or the second game. In some implementations, based on a fee and/or a wager placed by the player related to at least one aspect of the live or real event, and an outcome, status, stage, or occurrence of the live or real event, a payout can be applied to another portion of the first game, another game or portion of the first game, or to the second game or games. In some implementations, at least a portion of the payout due or paid to the player can be delivered to a participant of the event (e.g., such as a jockey of a horse race, football player or team, gamer, etc.)

In some implementations, the player can place a wager and/or fee before the live or real event occurs, and/or during the live or real event, and/or prior to an outcome, status, stage, or occurrence of the live event, at a certain time or stage of the live or real event, and/or when the live or real event starts.

In some implementations, an event stage of the first game can lead to a portion of the first game or another non-wagering game of the first game, including, but not limited to, any non-wagering game of the first game previously described herein. In some implementations, a live or real event stage of a second game can lead to a portion of the second game or another wagering game of the second game, including, but not limited to, any wagering game of the second game previously described herein.

Some implementations include at least one anti-cheat process or system, including, but not limited to the use of encrypted closed loops servers, software capable of tracking when people are using proxy servers and/or VPN clone servers. Some implementations include systems with smart phone and mobile encrypted servers that can be used to log into a game and for using a smart phone as a controller. Some implementations include in-room gambling on encrypted closed loop servers. For example, some implementations include the ability to use the system in a hotel room via TV and device/controller splitting bets from a skill based side, and an RNG gambling side (e.g., a game bifurcation).

Some implementations of the disclosure can implement a lottery system, e.g., such as a scratch card system for prizes in a game, or for extra turns on device, etc. In some implementations, the system can distribute to one or more players at least one scratch card system for prizes in a game, or for extra turns on device, etc.

Some implementations of the disclosure can use any action in any skills-based games (including those referenced herein) as a game action event. For example, shooting an opponent can be a game action event with any of the previously described results for game action events. In some implementations, skillful play can increase the chances of hitting a jackpot in a gambling portion of a game. Conversely, a player's actions lacking skill in a game can decrease the jackpot chances in some implementations. Either skillful play or wining a gambling portion can provide virtual or real currency useable as the player selects, and may include the purchase of various goods for or relating to the game. It should be noted that the skills-based games can be played without modification to the typical game play, preserving the fun and often addictive features of the original games, while adding the gambling component to further enhance the player experience. Some implementations enable the player to wager desired amounts to increase the stakes of the gambling portion of the integrated game.

Some implementations of the disclosure provide a refeed type of system in a BRG or other game. Some implementations provide a private refeed server configured to allow a queue of players to wait for a spot on skills-based devices. In some implementations, the server can enable players to wait to play with a professional or other highly skilled player or a specific or unknown player.

Some implementations modify or enhance existing play in games. For example, in a Fortnite® game, rather than winning by being the last player of one hundred to survive, an elimination threshold (for example, 300 eliminations) can be set as the winning accomplishment. Some implementations include a resetting of the game or the threshold if a professional or other, specified player is eliminated. These implementations can provide a substantially constant feed of players, and some implementations enable gambling on every elimination which in turn allows and has the ability to start building a line for a spectator feature within a casino or other physical or virtual venue.

Game developers are typically reluctant to share source code. Some implementations can use a variety of techniques to enable enhanced interfacing and coordination with games without using source code to determine game action events. For example, in some implementations, game sounds or other game characteristics can be detected and used to identify certain actions taking place in the game. In some implementations, the sound file for the type of sound applied to an object in the game helps identify the object and its value, if any. For example, if a fighter plane flies by and the player shoots it, the game interface can know what the fighter plane explosion sounds like and know how much to reward. A wide variety of analytical methods can be used to identify the sound including harmonic comparisons, sound file or profile analytics, and the like. Additionally, sound profiles can be used to provide an indication of the skill of the player in some implementations.

Figure 5:
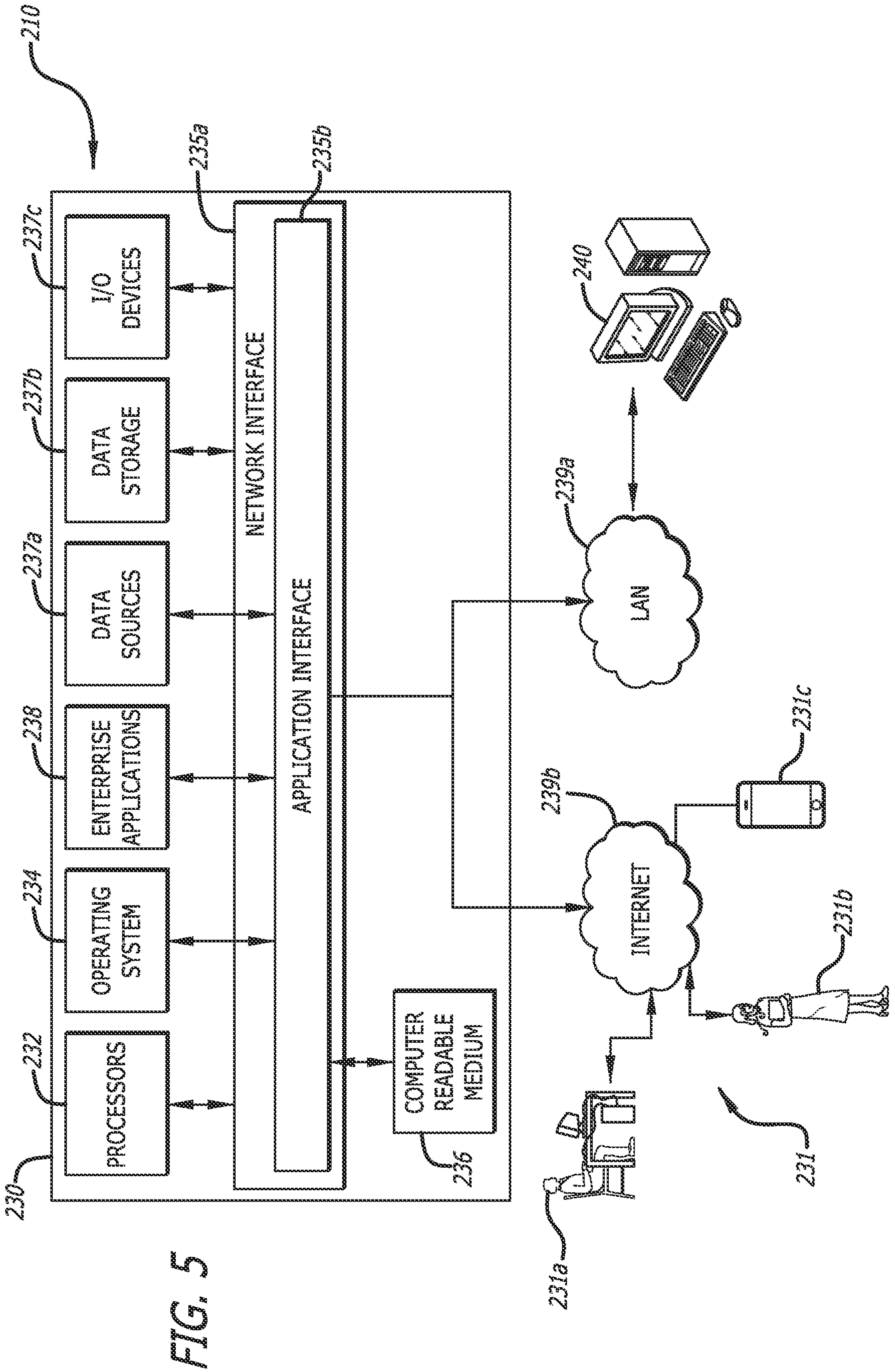
FIG. 5 illustrates a computer system enabling or comprising the systems and methods in accordance with some implementations of the disclosure.

FIG. 5 illustrates a computer system enabling or comprising the systems and methods in accordance with some implementations of the disclosure. In some implementations, the computer system 210 can include and/or operate and/or process computer-executable code of one or more of the above-mentioned software modules and/or systems. Further, in some implementations, the computer system 210 can operate and/or display information within one or more graphical user interfaces such as the GUI of FIG. 5. In some implementations, the computer system 210 can comprise the cloud and/or can be coupled to one or more cloud-based server systems.

In some implementations, the system 210 can comprise at least one computing device including at least one processor 232. In some implementations, the at least one processor 232 can include a processor residing in, or coupled to, one or more server platforms. In some implementations, the system 210 can include a network interface 235 a and an application interface 235 b coupled to the least one processor 232 capable of processing at least one operating system 234. Further, in some implementations, the interfaces 235 a, 235 b coupled to at least one processor 232 can be configured to process one or more of the software modules 238 (e.g., such as enterprise applications). In some implementations, the software modules 238 can include server-based software, and can operate to host at least one user account and/or at least one client account, and operating to transfer data between one or more of these accounts using the at least one processor 232.

With the above implementations in mind, it should be understood that the disclosure can employ various computer-implemented operations involving data stored in computer systems. Moreover, the above-described databases and models described throughout can store analytical models and other data on computer-readable storage media within the system 210 and on computer-readable storage media coupled to the system 210. In addition, the above-described applications of the system can be stored on computer-readable storage media within the system 210 and on computer-readable storage media coupled to the system 210. These operations are those requiring physical manipulation of physical quantities. Usually, though not necessarily, these quantities take the form of electrical, electromagnetic, or magnetic signals, optical or magneto-optical form capable of being stored, transferred, combined, compared and otherwise manipulated. In some implementations of the disclosure, the system 210 can comprise at least one computer readable medium 236 coupled to at least one data source 237 a, and/or at least one data storage device 237 b, and/or at least one input/output device 237 c. In some implementations, the disclosure can be embodied as computer readable code on a computer readable medium 236. In some implementations, the computer readable medium 236 can be any data storage device that can store data, which can thereafter be read by a computer system (such as the system 210). In some implementations, the computer readable medium 236 can be any physical or material medium that can be used to tangibly store the desired information or data or instructions and which can be accessed by a computer or processor 232. In some implementations, the computer readable medium 236 can include hard drives, network attached storage (NAS), read-only memory, random-access memory, FLASH based memory, CD-ROMs, CD-Rs, CD-RWs, DVDs, magnetic tapes, other optical and non-optical data storage devices. In some implementations, various other forms of computer-readable media 236 can transmit or carry instructions to a computer 240 and/or at least one user 231, including a router, private or public network, or other transmission device or channel, both wired and wireless. In some implementations, the software modules 238 can be configured to send and receive data from a database (e.g., from a computer readable medium 236 including data sources 237 a and data storage 237 b that can comprise a database), and data can be received by the software modules 238 from at least one other source. In some implementations, at least one of the software modules 238 can be configured within the system to output data to at least one user 231 via at least one graphical user interface rendered on at least one digital display.

In some implementations of the disclosure, the computer readable medium 236 can be distributed over a computer network via the network interface 235 a where the system embodied by the computer readable code can be stored and executed in a distributed fashion. For example, in some implementations, one or more components of the system 210 can be coupled to send and/or receive data through a local area network ("LAN") 239 a and/or an internet coupled network 239 b (e.g., such as a wireless internet). In some further implementations, the networks 239 a, 239 b can include wide area networks ("WAN"), direct connections (e.g., through a universal serial bus port), or other forms of computer-readable media 236, or any combination thereof.

In some implementations, components of the networks 239 a, 239 b can include any number of user devices such as personal computers including for example desktop computers, and/or laptop computers, or any fixed, generally non-mobile internet appliances coupled through the LAN 239 a. For example, some implementations include personal computers 240 coupled through the LAN 239 a that can be configured for any type of user including an administrator. Other implementations can include personal computers coupled through network 239 b. In some further implementations, one or more components of the system 210 can be coupled to send or receive data through an internet network (e.g., such as network 239 b). For example, some implementations include at least one user 231 coupled wirelessly and accessing one or more software modules of the system including at least one enterprise application (e.g., a software module 238) via an input and output ("I/O") device 237 c. In some other implementations, the system 210 can enable at least one user 231 to be coupled to access enterprise applications (e.g., software modules 238) via an I/O device 237 c through LAN 239 a. In some implementations, the user 231 can comprise a user 231 a coupled to the system 210 using a desktop computer, and/or laptop computers, or any fixed, generally non-mobile internet appliances coupled through the internet 239 b. In some further implementations, the user 231 can comprise a mobile user 231 b coupled to the system 210. In some implementations, the user 231 b can use any mobile computing device 231 c to wireless coupled to the system 210, including, but not limited to, personal digital assistants, and/or cellular phones, mobile phones, or smart phones, and/or pagers, and/or digital tablets, and/or fixed or mobile internet appliances.

Any of the operations described herein that form part of the disclosure are useful machine operations. The disclosure also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g., a cloud of computing resources.

The implementations of the disclosure can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some implementations, the manipulation can be performed by a processor. In such an example, the processor thus transforms the data from one thing to another. Still further, some implementations include methods that can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Figure 6:
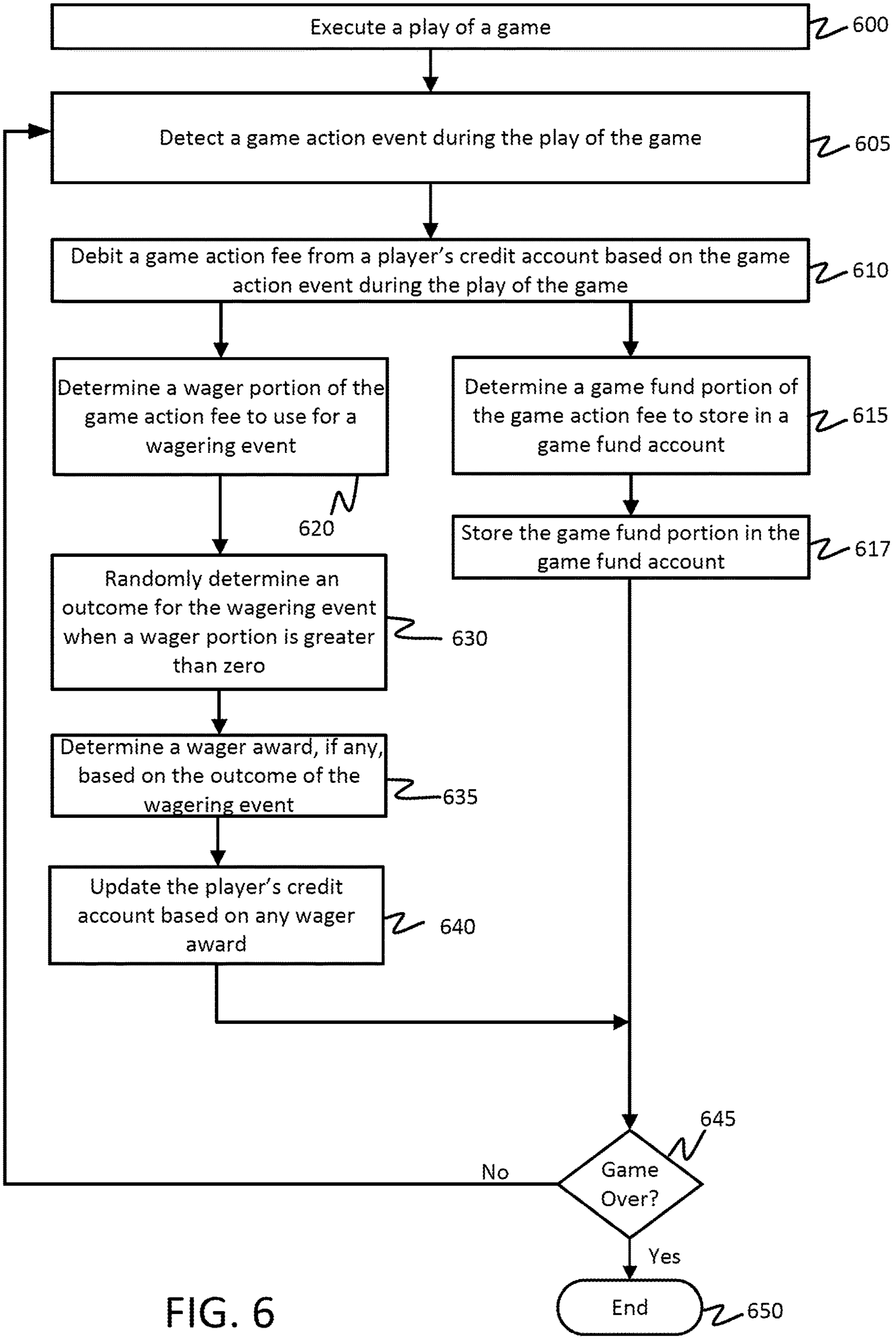
FIG. 6 is a flowchart of a method according to some implementations of the disclosure.

FIG. 6 illustrates one implementation of game device 100 that can enable accumulation of one or more return fees (also referred to herein as game fund portions of game action fees) over one or more plays of a game (e.g., the first game). The accumulation of the return fees can include building up a game fund account for a player using collected return fees. The return fees accumulated in a player's game fund account can be used in the same or similar manner discussed above in connection with the return fees as well as the various additional and/or alternatives ways to use the return fees. In various implementations, the return fee can be used to provide the player with prizes/awards, such as game fund awards, in a variety of different ways. In some implementations, the game fund awards may include, but are not limited to, credits or monetary awards. In some implementations, a game fund award can be used to modify the play of the game. In some implementations, modifying the play of the game may include adding or altering features, functions, virtual game objects/in-game assets, game objectives, game scenarios, virtual game characters. In some implementations, a game fund award can be used to modify a game before, during, or after a play of the game occurs. In some implementations, the game fund account is assigned or otherwise associated with one player. In some implementations, each player can have their own game fund account. In some implementations, funds in a player's game fund account are not provided to other players. However, in some alternative implementations, funds in a player's game fund account can be provided to other players (e.g., in competition games and other suitable scenarios).

FIG. 6 differs from FIG. 3 and FIG. 4 in that FIG. 6 details some implementations of a process of game device 100 that debits value from a player's main account (e.g., the account used for debiting money for the game action event) based on game action events. In some implementations, the game device 100 may bifurcate the debited value for a gambling/wagering event and for storage in a player's game fund account (e.g., a meter to hold and build value from one or more return fees/game fund portions). In some such implementations, certain designated game action events (e.g., transition points) are used to determine game fund awards that debit from the player's game fund account (an example of such a process is described in FIG. 8A) rather than a player's main account. In some implementations, the process in FIG. 6 does not take or otherwise debit a retained fee/game fee as is discussed in connection with some implementations of FIG. 3 and FIG. 4.

In some implementations, a play of a game may include starting a game and playing the game until the player reaches a designed termination point within the game (e.g., a player runs out of funds to play the game, a player's game character runs out of additional "lives", the player reaches the end of the game, the player ends the game early for any reason, etc.). In some implementations of a game without a natural termination point (e.g., role-playing games, MMOG, etc.), a play of a game may include the time a player starts to play the game and runs until the player pauses game play or exits game play for a predetermined period of time.

Turning to block 600, in some implementations, the game device 100 may execute a play of a game. In some implementations, the game can be a skill-based video game or a non-skill-based video game. Skill-based video games include action video games, action adventure video games, adventure video games, role-playing video games, strategy video games, sports video games, puzzle video games, idle video games, hybrids of the aforementioned, and/or the like. Non-skill based video games may include slot machine games or other suitable games that in some implementations rely on an RNG to determine an outcome.

In some implementations, as shown in block 605, the game device 100 may detect one or more game action events during a play of the game. As used herein, game action events may include transitions points. For example, a game action event can include providing player inputs at game device 100 to pull a trigger to shoot a virtual weapon in the game. In some implementations, the game action event could be one or more of the following shooting zombies, solving puzzles, winning a level, killing a boss, obtaining a special virtual object, finding treasure, hitting a bullseye, reaching a character level during a play of the game. It should be appreciated that the game action event can be any suitable event including during a game, but not limited to the transition points previously described herein.

In some implementations, as shown in block 610, the game device 100 can debit a game action fee from a player's credit account based on the game action event during the play of the game. For example, in some implementations, the game device 100 may determine that pulling a trigger to shoot a virtual weapon in the game will cost $2.00 as a game action fee. In some implementations, the game device 100 can debit $2.00 from the player's credit account. In some implementations, the game device 100 may update the player's credit account to reflect the debited $2.00. It should be appreciated that the game action fee can be any suitable amount or value.

In some implementations, as shown in block 615, the game device 100 may determine a game fund portion of the game action fee to store in a game fund account. For example, in some implementations, the game device 100 may determine that the game fund portion is 25% of the game action fee. Thus, if the game action fee is $2.00, the game device 100 may determine that the game fund portion is $0.50. In some implementations, the game fund portion can be any suitable percentage or portion of the game action fee (e.g., 1%, 10%, 95%, etc.). In some implementations, the game fund portion of the game action fee can be determined as a percentage or as a suitable numeric value. As will be discussed further below, there are a variety of ways the game device 100 can determine the game fund portion of the game action fee. In some implementations, the game fund portion is used interchangeably with the term return fee.

In some implementations, the game device 100 may dynamically determine a game fund portion of the game action fee to store in the game fund account. In some implementations, the game device 100 may determine the game fund portion based on the game action event detected in block 605. In some implementations, the determined game fund portion percentage of the game action fee can be based on the player's skill during game play. For example, in some implementations, the game device 100 may determine that a player performed a game action event that was above a predetermined threshold level of skill associated with the game action event (e.g., the player performed a sequence of difficult moves in a fighting game or the player made a difficult putt in a golf game). In some implementations, the game device 100 may determine during the game that the game fund portion should be increase to 30% (or some other suitable percentage) above a baseline 25% of the game action fee. In some implementations, the game device 100 may be configured with different game fund portion percentages that are associated with the player exhibiting one or more different predetermined threshold levels of skill. In some such implementations, if the game device 100 determines that the player exhibited a first level of skill, the game device 100 may increase the game fund portion to 30% (or some other suitable percentage). If the game device 100 determines that the player exhibited a second level of skill greater than the first level of skill, the game device 100 may increase the game fund portion to 45% (or some other suitable percentage). In some implementations, if the game device 100 determines that the player exhibited a level of skill that is greater than the skill level of 95% of other players, the game device 100 may determine that the entire game action fee for the game action event be stored in the player's game fund account. In some implementations, the opposite logic may also be applied to dynamically determining the game fund portion. For example, the game device 100 may determine that a player is doing poorly in a game or exhibits a low level of skill. In some implementations, the game device 100 may be configured to increase the game fund portion over a baseline percentage (e.g., 25%) to ensure that the game device 100 can provide the player with one or more encouraging prizes/game fund awards from the player's game fund account (e.g., as described in FIG. 8A).

It should be appreciated that the game device 100 can be configured to dynamically determine the game fund portion based on other factors in the game or even based on factors outside of the game. For example, the game device 100 may dynamically determine the game fund portion based on one or more player attributes, such as, but not limited to, the player's spend over a period of time, the player's birthday, the player's frequency of wagers, the player's speed of placing wagers. For example, if the game device 100 determines that it is the player's birthday, the game device 100 may increase the game fund portion for one or more game action events. In some implementations, the game device 100 may increase the game fund portion over a baseline percentage based on the game device 100 determining that the player has activated a predetermined quantity of game action events over a predetermined period of time (e.g., five game action events in 30 seconds). As other non-limiting examples, the game device 100 can be configured to dynamically determine the game fund portion based on the time of day (e.g., slow mornings where game play falls below a predetermined threshold may cause the game device 100 to increase the percentage for the game fund portion), holiday or events, events at a location, trigger by casino host, a moving average of the last X number of wagers (internal to the machine).

In some implementations, as shown in block 617, the game device 100 may store the determined game fund portion in the game fund account. In some implementations, the game fund account is a separate account from the player's main account or credit account. In some implementations, the game fund portions are stored in the same account as the player's credit account, but the two accounts are tracked separately to properly maintain the appropriate respective balances. In some implementations, the game fund portion stored in the game fund account is stored as monetary value. In some implementations, the game fund portion is stored as representation of a monetary value (e.g., credits, points, etc.). In some implementations, the game fund portion can be converted into something else of value and represented in the game fund account as one or more items of value (e.g., virtual game objects, lives the player has to continue to play a game, etc.).

In some implementations, the player's game fund account starts at a value of zero. In some implementations, the player's game fund account may start at a non-zero value. In some implementations, the player's game fund account may be initially funded from one or more third parties (e.g., hotels, game operators, casino operators, advertisers, etc.). In some implementations, the player's game fund account can be funded from third parties based on player loyalty information. As a few non-limiting examples, the player's game fund account can be initially funded by a casino or game operator, by a hotel, based on player points on a player tracking card, based on points or value earned from online games, other players, or through other suitable mechanisms. It should be appreciated that these funding sources can also later add or provide additional funds to the player's game fund account after the initial funding. The third party sources of funding may add funds to the player's game fund account independent of a game fund portion. As the player plays the game, the game device 100 may add additional game fund portions to the game fund account as the game device 100 detects certain game action events. Over time, the player can build the game fund account by executing one or more plays of a game, playing one or more rounds of a game, playing one or more different games, etc. In some implementations, the game fund account can be associated with the player, such that when the player plays certain games, the game fund account will be available to the player. In some implementations, in addition to being funded by the player at the game device 100, the player's game fund account can also be funded through other mechanisms. For example, as noted above, in some implementations, a player's game fund account can be funded from third parties. In some implementations, the player can fund the player's game fund account independent of actions at game device 100. In some implementations, the player can increase the player's game fund account playing one or more games at a different location and/or online. For example, in some implementations, for predetermined periods of time the player spends playing a game online (e.g., a same game, a similar game, a different game), a predetermined amount of value can be added to the player's game fund account. In some implementations, the game device 100 may update the player's game fund account based on any added game fund portion. It should be appreciated that, storing the game fund portion in the game fund account for future use enables a larger balance to build in the player's game fund account so that the game device 100 can provide different and/or larger game fund awards to the player. The game fund award can be provided as part of the game action event, during a later play of the game, or even in future plays of the game. In some implementations, the game fund account is portable between different games so that the game fund account can provide a game fund award to the player during plays of different games.

In some implementations, as shown in block 620, the game device 100 may also dynamically determine a wager portion of the game action fee to use for a wagering event. For example, in some implementations, the game device 100 may determine that the wager portion is 75% of the game action fee. Thus, if the game action fee is $2.00, the game device 100 may determine that the wager portion is $1.50. In some implementations, the wager portion of the game action fee can be any suitable percentage (e.g., 0%, 1%, 95%, etc.) of the game action fee. In some implementations, the wager portion of the game action fee can be determined as a percentage or as a suitable numeric value. In some implementations, the wager portion of the game action fee is determined relative to the dynamically determined game fund portion discussed above. Thus, in some implementations, the game device 100 may dynamically determine the wager portion based on the remainder of the game action fee not set aside to be stored in the player's game fund account.

It should be appreciated that there are a variety of ways the game device 100 can determine the wager portion of the game action fee. In some implementations, the apportionment between the wager portion and the game fund portion could be fixed for one or more game action events. In some implementations, the game device 100 may randomly determine, using the RNG, a selected percentage to use for the wager portion from one or more sets of percentages. In some implementations, the game device 100 may enable the player to select the percentage of the game action fee for the wager portion and/or the game fund portion. It should be appreciated that other suitable ways to determine the wager portion can be used.

In some implementations, as shown in block 630, the game device 100 may randomly determine an outcome for the wagering event when a wager portion is greater than zero. In some implementations, as noted herein, the wagering event can be part of the first game or part of the second game. In some implementations, the wager event can be part of some other suitable game (e.g., a third game, a fourth game, . . . an nth game) that is part of or independent of the play of the game (e.g., the first game). In some implementations, each wager event can be an independent game that is executed between zero and n times during the play of the game. It should be appreciated that in some implementations where the wager portion is zero, the game device 100 does not perform block 630 and a randomly determined outcome is not produced. In some implementations, the game device 100 may skip executing both block 620 and 630. In some implementations, the game device 100 may still randomly determine an outcome for the wagering event even when the wager portion is zero. In some such implementations where the wager portion is zero, the wager event can be a free game. In some implementations where the wager portion is zero, the game operator or a third party may fund all or part of the wager for the wagering event.

In some implementations, as shown in block 635, the game device 100 may determine a wager award, if any, based on the outcome of the wagering event and the wager portion. For example, in some implementations, if the randomly determined outcome for the wagering event results in a winning outcome, the game device 100 may provide a wager award to the player that is based in part on the randomly determined outcome (e.g., the randomly determined outcome results in three cherries on a pay line of a three reel slot machine game and an associated pay table for the three reel slot machine game indicates an award for the three cherries on a pay line). In some implementations, if the randomly determined outcome for the wagering event results in a losing outcome, the game device 100 does not provide a wager award to the player that is based in part on the randomly determined outcome (e.g., the randomly determined outcome results in a cherry symbol, a bell symbol, and a bar symbol on a pay line of a three reel slot machine game and an associated pay table for the three reel slot machine game indicates that such symbols on the pay line do not result in an award).

In some implementations, the game device 100 does not provide a wager award when the game device 100 does not rely on an outcome of a wager event (e.g., to the extent that block 620 and block 630 are not executed during a play of the game).

In some implementations, as shown in block 640, the game device 100 may update the player's credit account based on the wager award, if there is an award of credits or other numeric value. As is discussed herein, in some implementations, the game device 100 may provide the player with game modifications instead of or in addition to credits or money. It should be appreciated that in some implementations, the game device 100 does not update the player credit account when there is no wager award to provide (e.g., the wagering event is not executed; the wager event is executed but results in a losing outcome; etc.).

In some implementations, as shown in block 645, the game device 100 determines whether the play of the game is over/complete or the play of the game should continue. As discussed here, in some implementations, the game action event can be one of many that occur during a play of the game. For example, a game action event could include hitting one of multiple targets in a field. After shooting at a first target and triggering the blocks 605-645 of FIG. 6, the game device 100 may return to block 605 to repeat the process so that the player can proceed to shoot at a second target. As another example, one or more moves in a checkers game can be a game action event in some implementations. After making a move in the checkers game, the process shown in block 605-645 can be executed. If the game device 100 determines that the game is not over at block 645, in some implementations, the game device 100 may return to block 605 for the player or an opposing player to make another move in the checkers game. It should be appreciated that the game action events can be, but are not limited to, any one or more of the game action events described above.

It should be appreciated that in implementations where one play of the game loops through block 605-645 one or more times, the player has the ability to build up the game fund account. As also noted herein, the player can also build up the game fund account by playing multiple plays of the game and/or playing different games that incorporate at least part of the process discussed in FIG. 6 and are linked to the player's game fund account in various implementations. With a game fund account that includes larger balances than one return fee/one game fund portion, the game device 100 can provide one or more different or larger awards to keep the player's excitement to play the game. In some implementations, if the game device 100 determines that the play of the game is complete, the game device 100 may terminate the process as shown in block 650. In some implementations, the game device 100 may determine that the play of the game is over at block 645 if the player's credit balance is below a threshold (e.g., the player cannot contribute a game action fee during the continued play of the game). In some implementations, the game device 100 may determine that the play of the game is over at block 645 if a natural termination event occurs in the play of the game or the player pauses or exits the game. It should be appreciated that other suitable termination events can be used.

Figure 7:
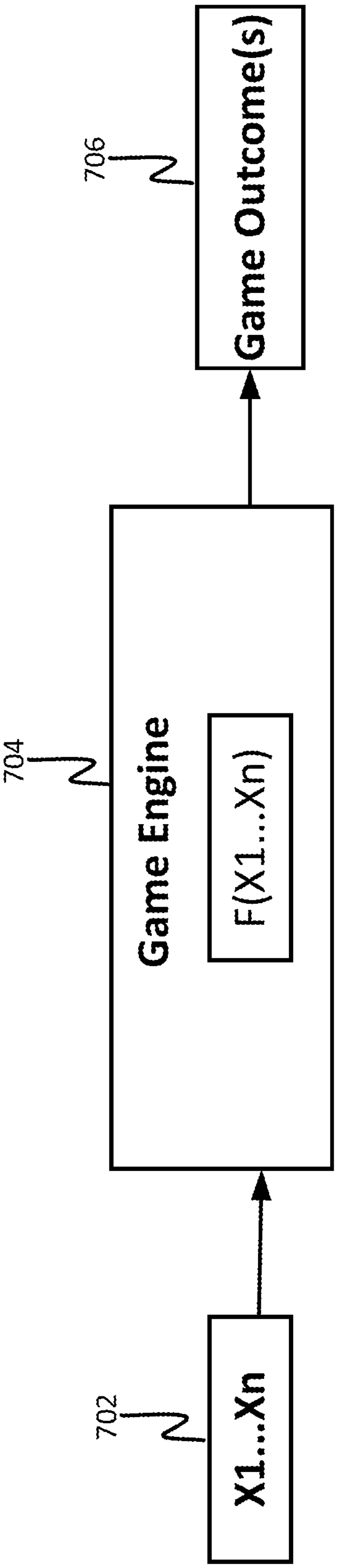
FIG. 7 is a flowchart of a method according to some implementations of the disclosure.

FIG. 7 illustrates one implementation of a play of a game with one or more game action events occurring during a play of the game. In some implementations, the game action events may occur within the first game without executing a second game. In some implementations, the game action events may include one or more plays of a second game. In some implementations, the one or more plays of a second game can include the same second game or one or more different second games. As shown therein, block 702 represent one or more player inputs during the play of the game, denoted as X1 . . . Xn that the game device 100 may receive during a play of a game. In some implementations, these player inputs are received by the game device 100. Such player inputs X1 . . . Xn may be received via any suitable user interface such as, for example, a joystick, buttons, on-screen selection, physical objects (e.g., steering wheels, weapons, etc.) and the like. In some implementations, the player inputs 702 can be provided to a game engine 704 of the game device 100. The game engine 704 of game device 100 can apply these player inputs 702 to one or more functions f(X1 . . . Xn). In some implementations, the function f(X1 . . . Xn) can map to one or more certain game outcomes 706.

In some implementations, the game device 100 can receive the player inputs 702 from the player through the user interface of the game. In some implementations, as discussed in connection with block 605 in FIG. 6, the game device 100 may determine whether one or more of the inputs is a game action event. In some implementations, multiple player inputs can be defined as a game action event. For example, if some defined subset of player inputs 702 is received through the user interface, the game device 100 may detect a game action event that causes the process in FIG. 6 to move to block 610. In one example, if (X1=x) (e.g., x=logical 1), the player's input is considered a game action event and may cause game device 100 to debit a game action fee from the player credit account. As one example, in a game where the player has possession of a particular virtual object (e.g., an in-game weapon), when the player fires the in-game weapon, the game device 100 may register the fired weapon as the game action event that triggers the game device 100 to debit a game action fee from the player's credit account.

In some implementations, the game action event could be an outcome of an event in a game rather than the direct action of the player. For example, the direct action of the player can be firing a virtual crossbow in the game. The game device 100 may not recognize firing the crossbow as the game action event to trigger block 610 in FIG. 6. Rather, in some implementations, the game device 100 can be configured to detect the game action event if the arrow from the virtual crossbow hit a target. That is, in some implementations, it might be the particular game outcome 706 that is designated as the game action event and not the player inputs 702. In some implementations, the game device 100 may be configured to recognize a combination of the player's input and the outcome from the player's input before determining that a game action event occurred in the game. For example, in some implementations, if the player's inputs X1 . . . Xn result in a game event that maps to the particular game outcome 706, the game device 100 may debit a game action fee from the player's credit account. For example, if the user inputs X1 . . . Xn (e.g., firing an arrow from the virtual crossbow) are received such that the game outcome 706 is a killed zombie, then game device 100 may determine that a transition event occurred. In another example where the player uses a shotgun, if the user inputs X1 . . . Xn (e.g., firing the shotgun) are received such that the game outcome 706 is a killed zombie, then game device 100 may determine that no game action event occurred because using the shotgun to kill a zombie is not mapped in some implementations as a game action event.

Figure 8A:
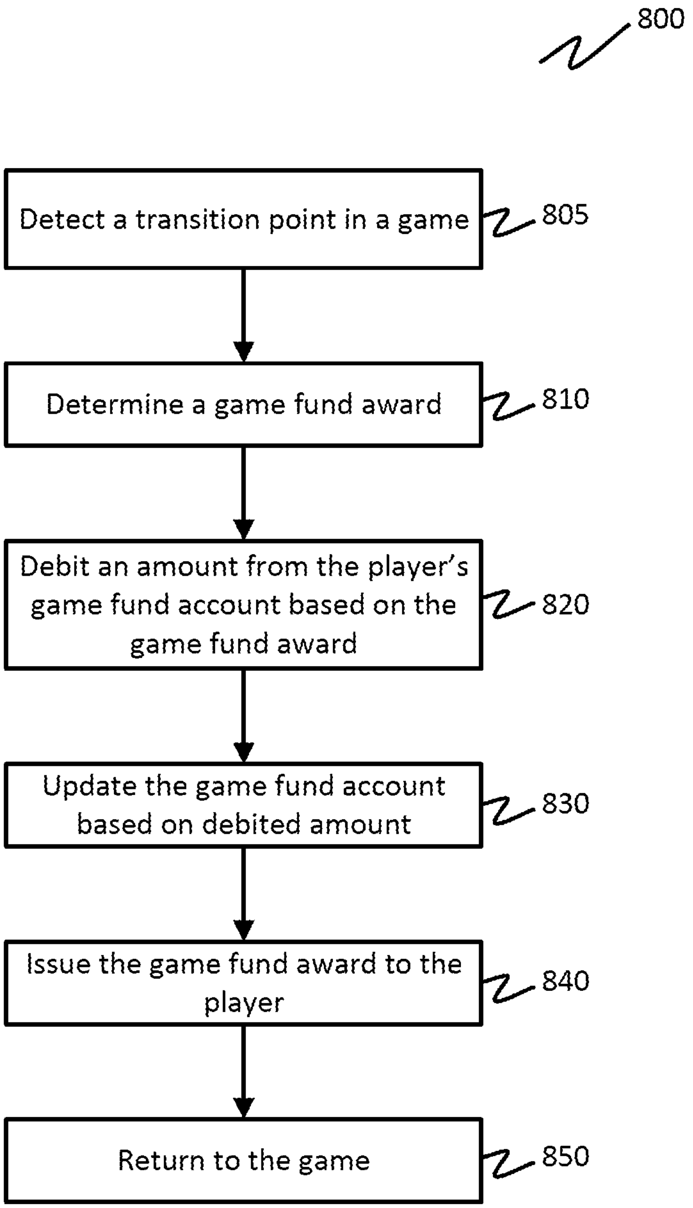
FIG. 8A is a flowchart of a method according to some implementations of the disclosure.

FIG. 8A and block 805 illustrates the start of one implementation of a process 800 that the game device 100 can use when providing a game fund award to the player. In some implementations, the game device 100 may execute the process 800 before, during, or after the process described in FIG. 6. In some implementations, the process 800 can be executed independent of the process described in FIG. 6. In some implementations, the process 800 can be triggered based on one or more blocks of FIG. 6 when the game device 100 determines that the player should receive a game fund award. In some such implementations, the process 800 can be triggered based on block 605, such as when the player exhibits a threshold level of skill in a particular in-game activity (e.g., driving a virtual golf ball straight down a fairway rather than hooking or slicing the golf ball) that results in a game fund award. As another example, in some implementations, the player may determine prior to starting a play of a game that the player wishes to obtain a new virtual game object for the game. The game device 100 may enable the player to obtain the new virtual game object as a game fund award or in exchange for a game fund award amount. It should be appreciated that the process 800 can be executed at any suitable time before, during, or after a play of a game.

In some implementations, the process 800 starts at block 805, where the game device 100 may detect a transition point in a game. In some implementations, a transition point can be one or more events or player actions in a game. In some implementations, a transition point is a reason to provide a prize or award to the player to keep the player's interest and enjoyment in the game. In some implementations, a transition point could be designated in the game to provide a prize (e.g., a game fund award) to the player for performing skillfully in the game. In some implementations, a transition point could be designated in the game to provide a prize (e.g., a game fund award) to the player when the player is performing poorly in a game (e.g., performing unskillfully). In an example in which the player is performing poorly in a game, providing the player with a prize may give the player a morale boost or otherwise encourage the player to continue to play the game despite the player's poor performance.

In some implementations, a transition point can be a player action such as shooting zombies, solving puzzles, completing a level, winning a level, killing a boss, obtaining a special virtual object, finding treasure, hitting a bullseye, reaching a character level in the video game, etc. In some implementations, a transition point can be a player action that the game device 100 determines is skillful or not skillful. The game device 100 may rate a player's action as skillful or not skillful on an objective scale for detecting a transition point. For example, if the player finds a treasure in a game within a first predetermined time period (e.g., 30 seconds), the game device 100 may determine that the player executed a first level of skill. Whereas, if the player finds the treasure in the game in less than a second predetermined time period (e.g., 20 seconds), the game device 100 may determine that the player executed a second level of skill. In some implementations, the game device 100 can be configured to detect a transition point for the second level of skill, but not the first level of skill.

In some implementations, a transition point can be a game action event that is designated as a transition point. In one example, the game device 100 may detect a transition point when a player strikes a specified target. In other examples, a player striking a specified target four consecutive times, successfully completing seven levels in a game, finding a specified number of items over one or more game levels, or the like. In some implementations, the player actions that are determined to be transition points are player actions that are more difficult than player actions designated as game action events. In some implementations, a game can have multiple transition points. In various implementations, a transition point can be, but is not limited to, any one or more of the game action events mentioned herein. In some implementations where game action events are designated as transition points, the game device 100 can be configured with fewer transition points than game action events.

In some implementations, an action or event in a game can be designated as a transition point, where the action or event in the game is not considered a game action event. In a zombie shooting game for example, in some implementations, pulling a trigger to shoot zombies during a level in the game can be designated as game action events (e.g., which may cause the game device 100 to execute the process described in FIG. 6). In some implementations, hits on a designated body part of zombies can be designated as a transition point or triggering a transition point. Thus, if a zombie head is designated as the hit zone for triggering a transition point, and the player hits a zombie in the head, the game device 100 may detect that the player reached or triggered a transition point, as illustrated in block 805. In some implementations, hitting a zombie with a bullet from a gun can be designated as a game action event, whereas hitting a zombie with an arrow shot from a bow and arrow can be designated as a transition point.

In some implementations, a transition point could be based on events in the game that occur without player input (e.g., randomly determined events, actions of a player's game character that happen automatically). In some implementations, a transition point could be based on events independent of the game. For example, the game device 100 could be configured to determine a transition point based on the player's spend over a period of time (whether at the game device 100 or at other games), the player's birthday, the player's frequency of wagers, the player's speed of placing wagers.

In some implementations, a transition point can be designated in a game as the point at which a game ends (e.g., block 645 of FIG. 6), when the player pauses the game, and/or when the player exits the game. In some implementations, the game device 100 may determine a game fund award based on a portion or all of the game fund account for such transition points. It should be appreciated that such a game fund award, provided at the point the game ends or the player is leaving the game device 100, can provide the player with a positive ending experience (e.g., a prize/award) regardless of the player's performance in a game or regardless of whether the game was paused or ended before the player had an opportunity to achieve the player's desired outcomes in the game.

Turning to block 810 of FIG. 8A, in some implementations, the game device 100 may determine a game fund award. In some implementations, the game fund award is predetermined or fixed for one or more transition points. In some implementations, the game device 100 may dynamically determine a game fund award for one or more transition points. In some implementations, the game device 100 may provide a game fund award to the player that is derived from the game fund account. In some implementations, the game device 100 may provide a game fund award to the player from the game fund account based on the player's actions in the game or using some other suitable basis. For example, in some implementations, if the player exhibits a threshold level of skill in performing a task in a game, the game device 100 may determine that a portion or all of the value in the game fund account can be provided as a game fund award to the player. In some implementations, if the player completes a game level during the play of the game, the player may naturally expect some type of award. In some such implementations, the game device 100 can determine a game fund award from the game fund account to satisfy the player's natural reward instinct during the play of the game. In some implementations, if the game device 100 determines that a player exhibits low skills or otherwise plays poorly during the play of the game (or even in prior plays of the game or other games), the game device 100 may determine a game fund award from the game fund account to provide to the player to boost the player's interest in the game. In some implementations, the game fund award from the game fund account can be limited to a game fund portion/return fee. In some implementations, the game fund award can be based on the total balance of the game fund account.

In some implementations, the game device 100 may provide a game fund award in some form of monetary value. In some implementations, the game device 100 can provide a game fund award as a dollar amount, or some other fiat or virtual currency (e.g., Euros, Bitcoin, etc.). For example, the game device 100 may provide a game fund award of $10 if the player's game fund account can support this prize amount. In some implementations, the game fund award can be credits that translate into monetary value or game credits that do not directly translate into monetary value. In some implementations, the game fund award can be used to purchase game features or game functions in addition to or as an alternative to monetary prizes. In some implementations, the purchased game features or game functions may result in a modification to the player of the game.

Figure 8B:
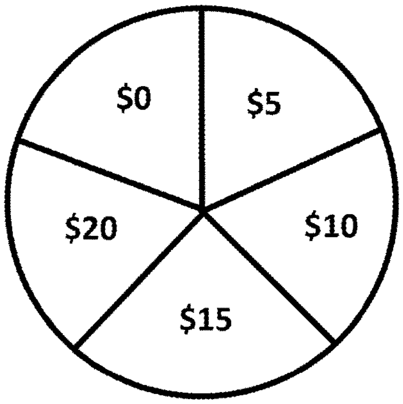
FIGS. 8B, 8C, 8D, and 8E are example selection sets of game fund awards according to some implementations of the disclosure.
Figure 8C:
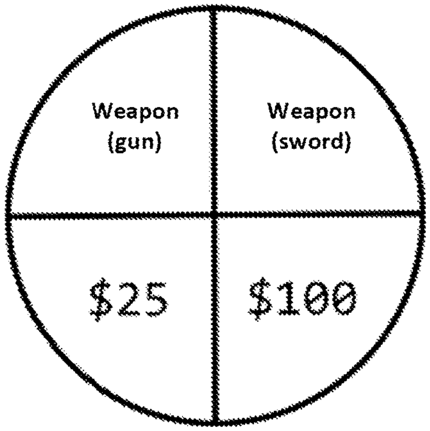

In some implementations, the game device 100 may provide a game fund award that is a result of a wager event, where the wager is made from a portion or all of the value in the player's game fund account. In some implementations, the player may select to have a game fund award based on the result of a wager event or select to have the game fund award without a wager event. In some implementations, the game fund award that is a result of a wager event is provided to the player automatically, without player input or selection. In some implementations, a game fund award using a wager event can be based on a statistical model whose value over time will yield the amount that was supposed to be paid to the player (e.g., a return to player or RTP of a specified value). For example, assume the player was initially deemed to receive a $10 prize as the result of a transition point from the player' game fund account. In some implementations, rather than presenting the player with a fixed $10 award from the player's game fund account, the game device 100 can be configured to randomly determine a prize from a set of prizes (e.g., a set of values such as, but not limited to, $0, $5, $10, $15, and $20). In some implementations, the random selection from the set of prizes can be presented as a spinning wheel containing different segments associated with the values $0, $5, $10, $15, and $20 as is illustrated in FIG. 8B. In some implementations, the spinning wheel segments can be configured with a probability of being selected (e.g., 20% for a wheel segment). It should be appreciated that the statistical value of this wheel or set of prizes (e.g., based on randomly selecting segments of the wheel) over time will converge to $10 (e.g., an RTP), which is the amount that the player was deemed to receive from the player's game fund account. However, by enabling the player to wager the $10 prize/game fund award from the game fund account, the game device 100 can potentially offer the player a chance to win a prize that is greater than the initially determined game fund award (e.g., $15 or $20). In some implementations using this wagering model to determine a game fund award, the game fund award can exceed the amount available in the player's game fund account. In some implementations, rather than provide the player with a complete loss (e.g., a $0 prize), the game device 100 may also include game features or game functions in addition to monetary prizes in a selection set. For example, in a fighting game, a selection set may include a gun and a sword in addition to monetary awards of $25 and $100 as shown in FIG. 8C.

In some implementations, a selection game can be offered to the player in exchange for an offered game fund award. The selection game can be a player selection game or a random selection made using an RNG. In some implementations, the selection game may enable the player to risk an offered game fund award for a higher game fund award. For example, in one implementation, the game device 100 determines that a player should receive an award of $50 based on a transition point. The game device 100 may debit this $50 from the player's game fund account and present the $50 game fund award to the player. As an option, the game device 100 may also offer the player the ability to risk the $50 game fund award for a selection set of alternative awards (e.g., three virtual treasure boxes or loot boxes). In some implementations, the player is informed that the selection set may include a much larger award (e.g., $125), a smaller award (e.g., $25), and a loss (e.g., $0). The awards can be assigned to one of the virtual treasure boxes in some implementations and the player is unaware which value is assigned to which virtual treasure box. If the player decides to risk the $50 game fund award for a chance at a larger award, the game device 100 may allow the player to select one of the virtual treasure boxes (or randomly select one of the virtual treasure boxes). The selection of one of the virtual treasure boxes may determine the player's new game fund award in some implementations. It should be appreciated that where the virtual treasure boxes have an equal probability of being selected, over time, the payout of these treasure chests is statistically $50, which is the amount of the player's game fund award.

In some implementations, the probabilities associated with wheel segments, treasure chests, and other prize selections mechanisms can be fixed or predetermined. In some implementations, the game device 100 can be configured to dynamically determine selection probabilities associated with wheel segments, treasure chests, and other prize selection mechanisms at the time the game fund award/prize is determined. In some implementations, the game device 100 can be configured to dynamically determine values for one or more selection sets. In some implementations, the dynamic determination of selection probabilities associated with prizes and/or the dynamic determination of values for the selection set can be done at any suitable time prior to the selection of the player's game fund award. In some implementations, the game device 100 can be configured to vary the number of selections available in a selection set (e.g., the number of segments that fit on a wheel, the number of treasure chests that fit on the screen). In some implementations, the dynamic determination of selection probabilities associated with prizes and the dynamic determination of values for one or more selection sets can be determined for a given return to player (RTP) percentage. In some implementations, the game device 100 may include a huge spinning reel to present the selection set, much like a classic slot machine, with any suitable number of symbols or values on it.

In some implementations, the game device 100 can dynamically determine the values placed in a selection set (e.g., wheel segments, treasure chests, and/or other prize selection mechanisms). In some implementations, the determination of the values for the selection sets (e.g., associated with wheel segments, treasure chests, etc.) may have been selected or achieved by the player prior to the time when the win occurs (e.g., the player may have obtained one or more values or game objects for the selection sets during the game, which can be stored for possible return to the player based on a transition point). That is, in some implementations, the virtual game objects or values for a selection set is not known to the game device 100 at the start of a play of a game, and may not be known to the game device 100 until a transition point is reached. For example, in some implementations during a play of a game, the player may collect one or more virtual game objects. Given the variability in the players skill levels, the potential variation of virtual game objects or values for a selection set can be extremely large and unable to be computed at the time the game on the game device 100 was design. In some implementations, the virtual game objects can be shrouded in a container (e.g., a box, bag, treasure chest) or clearly presented in the game without a container. The virtual game objects may be associated with something of value to play the game (e.g., a weapon, a shield, a ball, character health, character powers, etc.) or something of monetary value (e.g., $50, $15,000). In some implementations, the virtual game objects associated with monetary value may include tokens, gems, and other objects that may map to a particular monetary value (e.g., monetary value in a pay table). In some implementations, the virtual game objects associated with monetary value may expressly denote the value such as a cash value of $50. In some implementations, the player may collect values for the selection set. In some implementations, the virtual game objects collected by the player provide an expectation that the player has acquired a chance to win the collected virtual game object, such as in the wheel segments, treasure chests, or in other suitable prize selections mechanisms. In some implementations, this chance to win the collected virtual game objects and/or value may be determined if an appropriate transition point is reached.

In some such implementations, the player may acquire one or more virtual game objects as the player progresses through a level, world, scene, etc. of a game. In some implementations, different virtual game objects may be associated with different game features/functions or monetary value. In some implementations, when the player reaches or triggers a transition point, the game device 100 will display the virtual game objects the player has acquired (e.g., in the wheel segments, treasure chests, and/or in other suitable prize selections mechanisms).

In some implementations, these collected virtual game objects may be accompanied by other virtual game objects in the prize selection mechanisms based on the rules of the game. For example, in some implementations, a game device 100 may be configured to provide a $0 virtual game object (e.g., it could be no monetary value or it could be a virtual game object that is not associated monetary value) and/or a jackpot virtual game object that are possible for the player to "win" from the prize selection mechanisms. It should be appreciated that other suitable virtual game objects and associated values can be used. In some implementations, the $0 virtual game objects (or other similarly generated lower value virtual game objects) may be removed if the player has performed one or more actions deemed necessary to permit their removal. It should be appreciated that the virtual game objects not collected by the player represent a chance to win some one or more "Jackpot" or other high value prizes outside the scope of the actions (or inactions) taken by the player. Thus, in some implementations, regardless of the player's performance and actions prior to the transition point, the player may have a chance to win a high value prize.

While dynamic determination of value for selection set (e.g., for wheel segments, etc.) are discussed in terms of what a player can collect during a play of a game, it should be appreciated that the game device 100 can dynamically determine values for the selection sets in other suitable ways (e.g., based on player attributes such as the player's wagers placed over a predetermined time period, money spent on a game, etc.; based on attributes associated with the game device 100 such as an aggregate of wagers placed over a predetermined time period, etc.; based on attributes associated with factors external to the player and the game device 100 such as current scores in one or more active sports games).

It should be appreciated that because values and/or virtual game objects for one or more selection sets are dynamically determined during a play of a game in some implementations, the game device 100 may need to dynamically determine selection probabilities of the items in one or more selection sets. Enabling the game device 100 to dynamically determine selection probabilities associated with prizes and dynamically determine values for one or more selection sets for a given return to player (RTP) percentage was a previously unsolved technical challenge in the gaming industry. Heretofore, game designers relied upon predetermined quantities of prizes, prize values, and selection probabilities of prizes in a given selection set. The reason that quantities of prizes, prize values, and selection probabilities of prizes in a given selection set were predetermined is that computing selection probabilities of prizes to meet a selected RTP percentage requires more time and computing resources (e.g., processing power and memory) than is available during a play of a game. For example, it could take a computer anywhere from a few minutes to hours to find a solution of proper selection probabilities of prizes in a given selection set of prize values to match a particular RTP percentage or value. Anything more than fractions of a second to perform such determinations may render any such process unusable for dynamic determinations during a play of a game. Thus, game designers would predetermine selection probabilities for predetermined values for games due to the intensive computing resources and time involved. Creating games using values and selection probabilities that were not predetermined have been out of reach of game designers.

One example of the technical problem is illustrated in a wheel-based selection mechanism for a game. Consider a wheel with segments similar to those found in FIGS. 8B-8E. The prizes associated with segments of a wheel represents the prizes available for selection in a selection set of prizes. For explanatory purposes, a game device 100 may include a simple wheel with two segments. One wheel segment can be worth $0, while the other wheel segment can be worth $1000. These two values may have been dynamically determined, as described above, while the player played a game (or at least sometime after the game design was completed). If the game device 100 determines that the player is supposed to statistically receive, on average over time (e.g., the RTP), $10 for spins of the wheel (e.g., the prize or the game fund award), the game device 100 determines selection probabilities associated with the two wheel segments. Over many plays of the game, the determined selection probabilities of the wheel segments will enable the prize values won over many spins of the wheel to converge to $10 for the player (even though the wheel has no wheel segment for $10). For example, by setting the probability of receiving $1000 to 1%, and by setting the probability of getting $0 to 99%, the prize values won over many spins of the wheel will converge to the desired $10. That is, in this example configuration, most of the time, the game device 100 will randomly select the $0 prize and occasionally select the $1000 prize. A calculation to determine such selection probabilities for two values ($0 and $1000) to return $10 over time is simple for a computer to determine. However, most games do not use such small sets for selection and having a player lose 99% of the time is a poor game design that is unlikely to attract players.

Altering one of the variables, such as increasing the number of values (e.g., adding more than two segments to the wheel) makes the calculation non-trivial and computationally infeasible to determine during a play of a game using known game design techniques. Consider an example where the wheel includes three segments rather than just two segments. The wheel segments can be associated with $10, $75, $250, and the wheel (over time) is meant to return $55 (e.g., the RTP) to the player as a game fund award. There exist an infinite number of possible solutions for the selection probabilities associated with each of these three values so that over time, the player would statistically receive $55. For example, one solution, amongst the infinite possible solutions, is to set the probabilities of 52.03%, 40.08%, and 7.90% for the three segments, respectively. A known process of determining the appropriate solution is to use brute force computing power to generate hundreds of thousands of different selection probability variations for the values and select one or more of the generated selection probability combinations that statistically result a RTP of $55. In other words, the known determination methods involve making hundreds of thousands of processor computations and hundreds of thousands of reads and writes to and from memory to find suitable solutions. This process can take from several minutes to hours for a computer to find appropriate solutions. Such time delays created by a game device 100 attempting to determine the appropriate solutions would result in unacceptable pauses or breaks during a play of a game. Moreover, one or more of the generated selection probability combinations, while statistically appropriate, may also result in unacceptable game play. For example, one or more of the suitable generated selection probability combinations could be overly volatile or not volatile enough (e.g., a player may receive too few wins of any value or too many low value wins). Additional alterations to other variables (e.g., changing the number of values used for a selection set and changing the values used for the selection set) can further complicate acceptable computational determinations of selection probabilities of the values (and/or objects) in the wheel segments for a game device 100.

Figure 10:
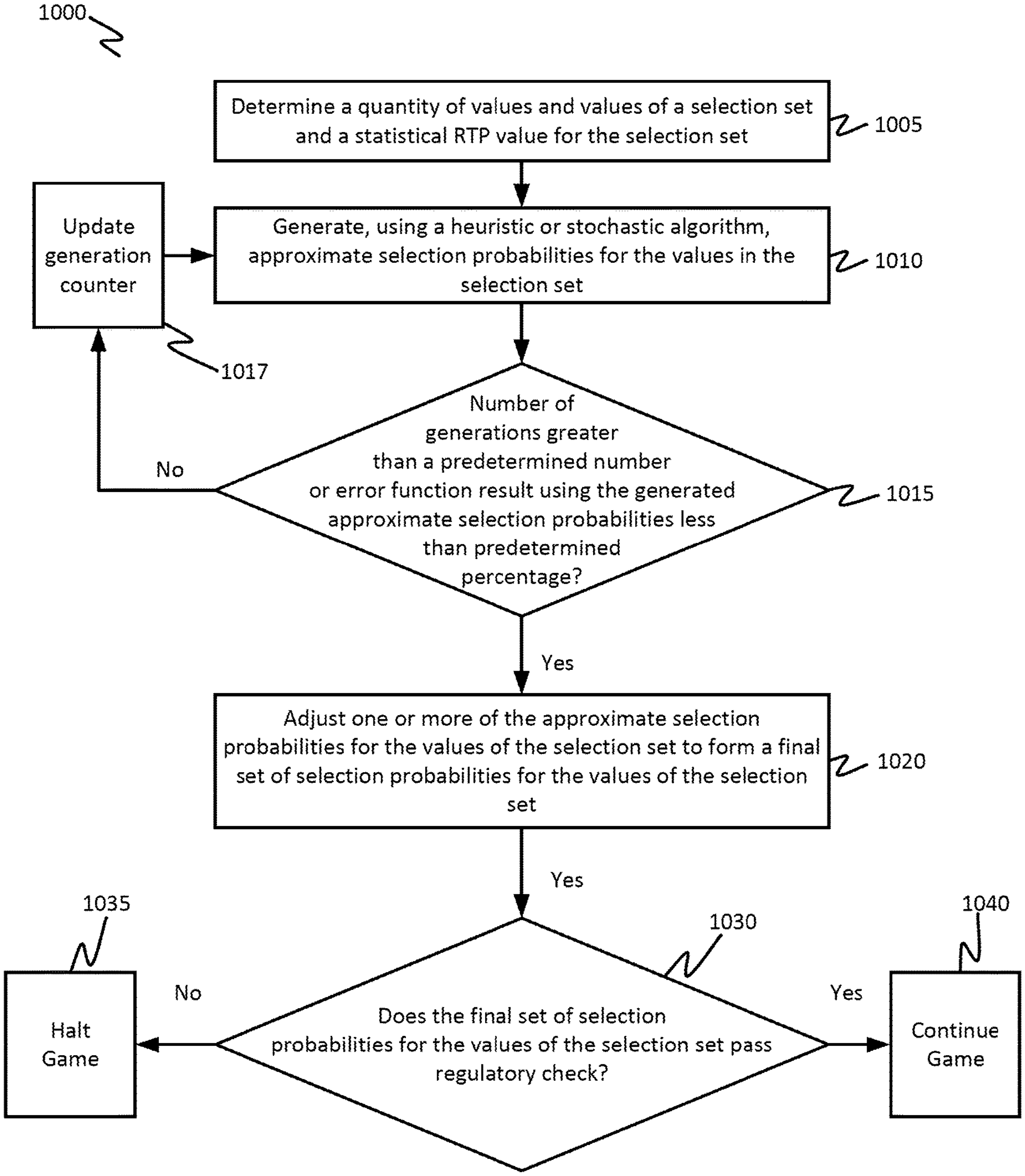
FIG. 10 is a flowchart of a method according to some implementations of the disclosure.

In some implementations, one solution is illustrated in process 1000 of FIG. 10, which overcomes the computational challenges outlined above and also results in a technological improvement to game device 100. In some implementations, as illustrated in block 1005, upon triggering a transition point, the game device 100 may determine a quantity of values and values of a selection set. The game device 100 may also determine a desired statistical RTP value for the values (or objects) in a selection set. In some implementations, the statistical RTP value is a value of the game fund award determined in block 810 of FIG. 8 from the player's game fund account. Alternative RTP values can be selected based on other suitable factors.

In some implementations, as illustrated in block 1010, the game device 100 may generate, using a suitable heuristic algorithm, approximate selection probabilities for the values in the selection set. In some alternative implementations, the game device 100 may generate, using a suitable stochastic algorithm, approximate selection probabilities for the values in the selection set. In some implementations, the game device 100 may generate approximate selection probabilities of the values in the selection set using a combination of both a heuristic algorithm and a stochastic algorithm. For example, the game device 100 may use a heuristic algorithm to generate approximate selection probabilities for the values of the selection set and then use a genetic algorithm or other stochastic search algorithm to further refine the approximate selection probabilities for the values for the selection set.

In some implementations, as illustrated in block 1015, after generating a set of approximate selection probabilities, the game device 100 determines whether an error function result using the generated approximate selection probabilities is less than or equal to a predetermined error function value. For example, the predetermined error function value can be 0.001 or some other suitable number. If the game device 100 determines that the error function result is less than or equal to a predetermined error function value, the game device 100 may move to block 1020. If the game device 100 determines that the error function value is greater than the predetermined error function, the game device 100 may also determine whether the heuristic algorithm has been used to more than a predetermined quantity of times to generate approximate selection probabilities. If the error function value is too large and the heuristic algorithm has not been used more than a predetermined quantity of times, the game device 100 may move to block 1017 and to block 1015 to repeat the process to generate additional approximate selection probabilities for the values in the selection set. It should be appreciated that the game device 100 can be configured to determine approximate selection probabilities for the values in the selection set that come close producing the desired statistical RTP value.

In some implementations, as illustrated in block 1017, if the game device 100 repeats the generation process for additional approximate selection probabilities, the game device 100 may update a generation counter. In some implementations, when the generation counter is above a predetermined threshold (e.g., one thousand generations), the game device 100 may stop searching for additional approximate selection probabilities, even if the error function result for a set of approximate selection probabilities is not less than or equal to the predetermined error function value.

In some implementations, as illustrated in block 1020, after generating approximate selection probabilities for the values in the selection set, the game device 100 may be configured to adjust one or more of the approximate selection probabilities for the values of the selection set to form a final set of selection probabilities for the values of the selection set. In some implementations, the game device 100 may increment and/or decrement one or more of the approximate selection probabilities of the values in the selection set to form the final set of selection probabilities for the values. In some implementations, the final set of selection probabilities of the values, when randomly selected over time, will result in a statistical RTP value for the selection set that matches the desired statistical RTP value. In some implementations, the game device 100 may use one or more suitable algebraic formulas to solve for the one or more adjusted approximate selection probabilities. In some implementations, the game device 100 may use brute force to generate a small number of different probabilities to find the correct adjustment to the one or more of the approximate selection probabilities to reach the desired statistical RTP value for the selection set.

In some implementations, as illustrated in block 1030 the game device 100 may perform a check to determine whether the final set of selection probabilities for the values of the selection set result in a statistical RTP value that matches the desired statistical RTP value. In some implementations, the game device 100 may run an error function calculation to determine the accuracy of the final set of selection probabilities for the values in the selection set. In some implementations, the verification is to confirm that the game device 100 maintains a desired overall RTP and to pass any necessary regulatory verification. In some implementations, as illustrated in block 1035, if the verification in block 1030 is negative, the game device 100 may halt game and alert an operator of a malfunction. In some implementations, as illustrated in block 1040, if the verification in block 1030 is positive, the game device 100 may award the player the selected prize and continue the play of the game. For example, continued play of the game may include the game device 100 showing the dynamically selected values and/or virtual game objects added to wheel segments, spinning the wheel for a random selection of one or more of the wheel segments, and awarding one or more prizes to the player based on the randomly selected one or more wheel segments. The game may further continue in other suitable ways (e.g., the player returns to shooting zombies, the player returns to driving a race car, the player continues to hunt treasure, etc.).

Process 1000 permits game device 100 to determine selection probabilities for any suitable number of values in a fraction of a second. By approximating selection probabilities that get close to the correct selection probabilities to produce the desired statistical RTP value, the game device 100 can avoid making hundreds of thousands of unnecessary processor calculations and performing hundreds of thousands of unnecessary memory read/writes. Thus, it should be appreciated that process 1000 improves the operation of a game device 100 by reducing memory and processor usage. Process 1000 also enables the game device 100 to work with dynamically determined values and dynamically determined RTP values during a play of a game, which was previously unavailable to game designers. Moreover, process 1000 allows the game device 100 to be more flexible than was possible before because a new level of variability in prizes can be offered in a game device 100. In some implementations, this new level of variability in prizes can relate back to the player's activity in a game, which was not previously possible.

It should also be appreciated that the game fund award based on the game fund account can be provided to the player in various ways. Some of the various implementations of game device 100 providing game fund awards to the player are discussed herein (e.g., providing credit awards, monetary awards, game alterations, game features, virtual game objects, etc. to the player). In some implementations, the game device 100 can modify the game as part of the game fund award. In some implementations, the game device 100 may determine that for a predetermined amount from the game fund account, the game device 100 can modify the game in a particular way to make it easier for the player to achieve or hit one or more game goals or targets. In some implementations, the game device 100 can modify the game to shield the player's game character from certain attacks in exchange for at least a portion of the game fund account. Various other nonlimiting examples of game play modification are discussed herein. Other suitable ways can be implemented to provide game fund awards to the player from the game fund account.

In some implementations, providing a game fund award to the player may trigger a game modification process. For example, if the game modification provides a game fund award of credits as an award or as part of the award to the player, the game device 100 may determine the value of the credits that will be deducted from the player's game fund account. Another example, where the game modification may include providing a game fund award to enable a player to acquire a virtual game object (e.g., a weapon, shield, a vehicle, health booster, etc.) or other game enhancements/modifications (e.g., game hints, skipping levels, skipping one or more required game activities, etc.), the game device 100 may determine, from a table of values mapped to the virtual game object or the game enhancement/modifications, the cost of the player's selection. In some implementations, the game device 100 does not provide the player with a choice to purchase a virtual game object or other game enhancements/modifications, but rather randomly or deterministically selects a virtual game object or other game enhancements/modifications to provide to the player and then determines the associated value for the virtual game object or other game enhancements/modifications.

In some implementations, a game modification as a game fund award may include enabling a player to purchase a virtual game object (e.g., a weapon, shield, a vehicle, health booster, etc.) during a play of a game that can enhance the player's game experience. In some implementations, the game device 100 triggers the request for the game modification independent of the player (e.g., without the player's explicit request). In some implementations, the game device 100 may receive the game modification request based on the player's input. In some implementations, the game device 100 may prompt the player with one or more offers of a game fund award when the player's game fund account is sufficiently funded. In some implementations where the game device 100 offers the one or more game fund awards to the player, the game device 100 may receive the player's input based on the transition point that triggered block 805 of process 800.

Figure 8D:
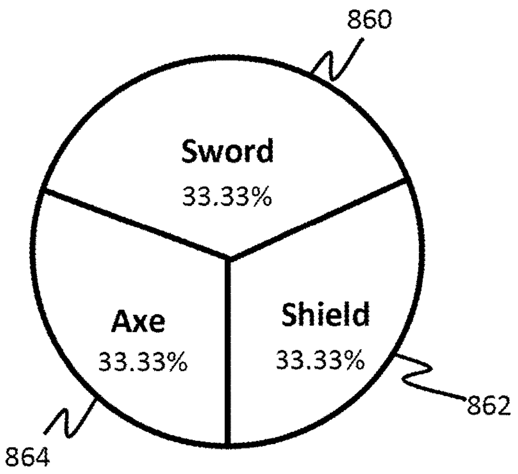
Figure 8E:
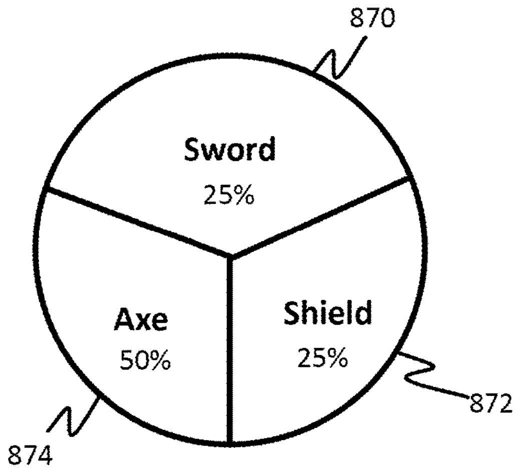

In some implementations, a game modification may include executing a different game (e.g., a second game as previously discussed). In some implementations, the different game may include a non-skill game, where the outcome of the non-skill game is derived from one or more RNGs. In some implementations including the different game, the game device 100 may randomly determine one or more virtual game objects to provide to the player from a set of a plurality of different virtual game objects using the RNG. In some implementations, the virtual game objects can be associated with one or more different probabilities of being randomly selected for the game device 100 to provide to the player. For example, the different game may execute to provide the player with a randomly generated opportunity to obtain one of three virtual golf game objects (e.g., a golf ball, a putter, and a driver) to use in a first game (e.g., a golf game). In some implementations, the three virtual golf game objects have the same probability of being selected. In some implementations, the three virtual golf game objects can be associated with a different probability of being randomly selected. In some implementations, the game device 100 may debit a game fund award amount from the player's game fund account based on the randomly generated opportunity to obtain one of the three virtual golf game objects. In some implementations, the game device 100 may debit a game fund award amount based on the value of one of the randomly selected virtual golf game objects that was selected for the player. In some implementations, the game device 100 may maintain different sets of virtual game objects. In some implementations, the different sets of virtual game objects have different probabilities of being selected for use in the different game. In some implementations, the game device 100 may automatically increase the probability that a more desirable set of virtual game objects is selected for use in the different game based on debiting a game fund award from the player's game fund account. In some implementations, the game device 100 may enable a player to choose to increase the probability that a more desirable set of virtual game objects is selected for use in the different game based on debiting a game fund award from the player's game fund account. In some implementations, the game device 100 may also enable an alteration of the probability of one or more of the virtual game objects in the virtual game object set so that one or more of such virtual game objects has a higher likelihood of being randomly selected and provided to the player. One example implementation of altering selection probabilities in a virtual game object set is illustrated in FIGS. 8D and 8E. In FIG. 8D, the game device 100 may include a virtual game object set of a sword, a shield, and an axe. The game device 100 may display the sword in a first segment of the wheel 860, the shield in a second segment of the wheel 862, and the axe in a third segment of the wheel 864. In some implementations, the sword, shield, and axe can be configured with an equal probability of being selected by the game device 100 (e.g., 33.33% probability of being selected). In some implementations, the player may need the axe to successfully complete an upcoming segment in the game, making it beneficial to the player to increase the chance to obtain the axe. In some implementations, the game device 100 may alter the selection probabilities of virtual game objects to increase the chance that the player obtains the axe virtual game objects. As shown in FIG. 8E, the game fund award can be used to increase the selection probability of the axe to 50% in wheel segment 874. Whereas the game device 100 may decrease the selection probability of the sword in wheel segment 870 to 25% and decrease the selection probability of the shield in wheel segment 872 to 25%. It should be appreciated that the illustrated selection probabilities are merely examples and that other suitable selection percentages can be assigned to the virtual game objects.

In some implementations, the player is unaware of the value of the player's game fund account. In some implementations, the player is unaware of the existence of the player's game fund account. In some implementations, the game device 100 may provide a visible or accessible game fund account meter to the player so that the player is aware of the player's game fund account and/or the value or balance of the player's game fund account. In some implementations, the player's game fund account can be expressed in different ways for different games. For example, in some implementations, if the player is playing a battle game, the game device 100 may provide the player a list of available weapons that the player can obtain that are based on the value of the player's current game fund account balance. In such implementations, the game device 100 does not provide the player with an indication of a credit or monetary value of the player's game fund account balance. As another example, in some implementations, if the player switched to playing a strategy game such as chess from the battle game, the game device 100 may offer the player game hints on making the optimal move of a chess piece that are based on the value of the player's current game fund account balance. In such a chess implementation, the game device 100 may provide fewer available hints during a play of a game when the player's game fund account balance is low (e.g., 2 available hints when the balance is equivalent to $4.00) and provide a greater quantity of available hints when the player's game fund account balance is higher (e.g., 4 available when the balance is equivalent to $8.00).

In some implementations, the game device 100 can make game modifications available to the player based on the game fund account, but require the player to work or use some level of skill to obtain the game modifications. For example, in some implementations, the game device 100 may place or add virtual game objects (e.g., modifications to the game) into a game based on the player's game fund account. In some implementations, the player must search for these virtual game objects in the game to obtain the virtual game objects. If the player finds and acquires the virtual game objects, the game device 100 may deduct a game fund award associated with the acquired virtual game object. In some implementations, the game fund award can be deducted when the virtual game objects are placed within the game world for the player to find and obtain, rather than when or the virtual game objects are acquired by the player. In some implementations where the game device 100 placed virtual objects in the game (e.g., either based on the player's game fund account or independent of the game fund account), but the player was unable to find and acquire these virtual game objects, the game device 100 may offer one or more of these virtual game objects (or other virtual game objects) for the player to acquire in exchange for a deduction of the game fund award from the player's game fund account. In some implementations, if the player is unable to acquire the virtual game objects, these virtual game objects may be forwarded, or transferred, into a subsequent level, world, stage, etc. of the game. In some implementations, the unacquired virtual game objects can be transferred to a different game. As noted above, the player does not need to be aware that acquiring such virtual game objects is done in exchange for funds in the player's game fund account. Thus, it should be appreciated that the game fund account can be used to make the video game more enjoyable to a player and adjust the game in a way to normalize a skill level required to play the game for skilled players and unskilled players.

In some implementations, the game device 100 can determine that a game modification is requested in response to a change in at least one game play condition for meeting a game objective during the game play. For example, conditions during a play of a game may suddenly change so that a significant strategy change is required in the game. In one implementation, virtual game characters that represent the player during game play often have a particular skill set or are provided with certain powers that have advantages and disadvantages. One such virtual game character may be a virtual ice monster that is vulnerable to heat and fire. If the virtual game character that represents the player is in a level of a game that exposes the virtual game character to heat and fire situations, it may be extremely difficult for that player to beat the level with fire without a high level of skill or help through modification of the game. Thus, in some implementations, based on the game fund account, the game device 100 can offer certain fire protections or fire immunities to the player that can be acquired (e.g., whether automatically or selected by the player) using the game fund account to help the player's virtual character advance through the level.

In some implementations, the game device 100 may determine whether the player's game fund can support the game fund award before proceeding. In some implementations, this determination can be performed before block 810, but could occur at other suitable times in the game. In some implementations, if the game device 100 determines that the player's game fund cannot support the game fund award, the game device 100 may terminate process 800 early (e.g., after block 805). If the game device 100 determines that the player's game fund can support the game fund award, the process 800 may proceed to block 810.

Returning to FIG. 8A, in some implementations, as shown in block 830, the game device 100 may update the game fund account based on the debited amount for the determined game fund award. In some implementations, as illustrated in blocks 840 and 850, the game device 100 may issue the game fund award to the player and return to the game. It should be appreciated that the process 800 can be run or executed one or more times during a play of a game. The process 800 can be run as part of the process detailed in FIG. 6 or during any other suitable time during a game. It should be appreciated that the game fund account is a novel mechanism to build value to provide the player with game fund awards for any number of situations, where these situations can be independent of awards derived from wagers on random outcomes.

Figure 9:
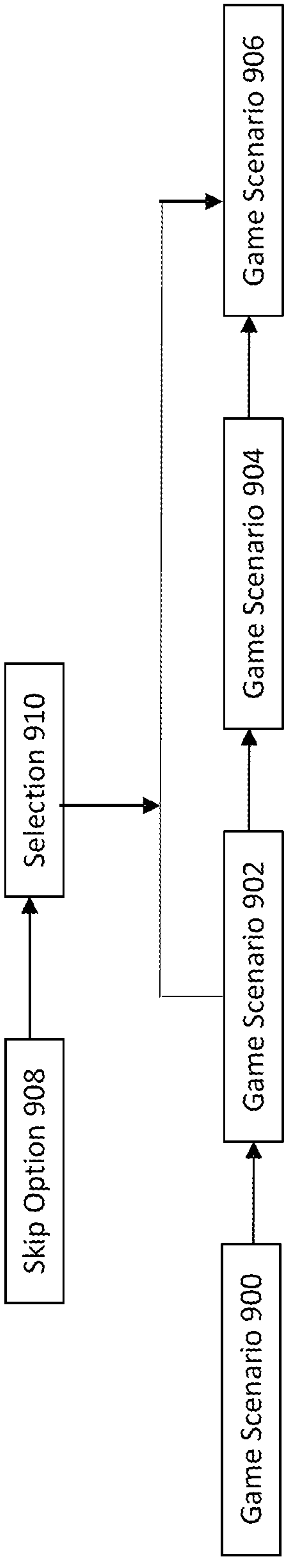
FIG. 9 is a flowchart of a method according to some implementations of the disclosure.

FIG. 9 illustrates another example of a game modification based on the game fund account, such as discussed in connection with FIG. 8A. In some implementations, a game modification includes bypassing a segment of a game (e.g., a game level, facing off against a game character, skipping a vehicle race, etc.). FIG. 9 illustrates a sequence of game scenarios 900, 902, 904, and 906 in a play of a game. In some implementations, these game scenarios are typically played in an order/sequence in a game (e.g., winning against four different characters, racing four different races, etc.). For example, the player may fight a first character in game scenario 900 before progressing to fight a second character in game scenario 902. Similarly, in some implementations, in order to reach game scenario 904, the player may first fight a second character in game scenario 902. One or more of these game scenarios 900-906 provides an example of a game play segment during a play of the game. While the example discussed herein references a game with express order/sequences, it should be appreciated that the bypassing feature can be applied to a game without express order/sequences.

It should be appreciated that one or more of the game scenarios 900-906 could be difficult or unenjoyable to the player. For example, the player may find game scenario 904 particularly difficult or unenjoyable. As such, the player may request or the game device 100 may present a bypass or skip option 908 to the player for the game play segment (e.g., the game scenario 904 in this example) through the user interface of the game device 100. The game device 100 may then receive a selection 910 of the skip option 908 through the user interface of game device 100. In response to receiving the selection 910 of the skip option 908 through the user interface of game device 100, the game play segment (e.g., the game scenario 904 in this example) is bypassed. Thus, the player would be allowed to go directly to game scenario 906 upon progressing past game scenario 902. In some implementations, the game device 100 also debits a game fund award amount associated with the skip or bypass option from the player's game fund account. It should be appreciated that the skip or bypass option can be applied to any game in any suitable manner and is not limited to the sequential game scenarios presented in this illustration of FIG. 9.

Another example of a game modification based on the game fund account includes adjusting a timer in a game. For example, in some implementations, a game may include a timer. In some implementations, a player may attempt to perform one or more tasks or activities in a game before the timer reaches a determined threshold (e.g., counts down to a number, counts up to a number, etc.). In some implementations, the game device 100 can adjust a timer in a game (e.g., speed up, slow down, or stop the timer) to give the player longer periods of time to complete the one or more tasks or activities. As with other game modifications, the game device 100 may debit a game fund award amount associated with the timer adjustment from the player's game fund account as discussed in connection with FIG. 8A. In some implementations, the game modification including adjusting the timer in a game can be a result of the player selecting an option to adjust the timer or the game device 100 may automatically apply a timer adjustment based on a triggering event (e.g., determining that the player is playing poorly—player advancing through the game slowly; player missing a threshold number of shots; etc.) and availability of value in the player's game fund account.

Another example of a game modification based on the game fund account includes providing a practice scenario for a game. In some implementations, the game device 100 may enable a player to enter into a practice scenario during a play of a game. In some implementations, a practice scenario includes a portion or all of a game, or an experience similar to the game they were playing. In some implementations, the practice scenario enables the player to practice at least one at least a portion of a game to understand a game and/or improve the player's actions in the game or alter how the player performs at least one game objective in the game. In some implementations, the game device 100 can offer the practice scenario to the player, the player can request the practice scenario, or the game device 100 can automatically enter the practice scenario for the player. In some implementations, the details included in the practice scenario may reveal information about a next level, round, boss, etc., thereby posing an incentive to the player to enter the practice scenario at the cost of funds (e.g., a game fund award amount) from the game fund account. The cost debited from the player's game fund account may or may not be communicated to the player.

As with other game modifications, the game device 100 may debit a game fund award amount associated with the practice scenario from the player's game fund account as discussed in connection with FIG. 8A. In some implementations, the game fund award amount may vary depending on how long the player elects to stay in the practice scenario of the game. For example, the game device 100 may deduct a first fee (e.g., $1) from the player game fund account for playing a 30 second segment of a game in the practice scenario, while the game device 100 may deduct a second different fee (e.g., $5) from the player game fund account if the player plays a 5 minute segment of a game in the practice scenario.

In some implementations, when the player enters a practice scenario, the game device 100 may suspend one or more functions of the game. For example, in some implementations, the game device 100 may suspend the process discussed in connection with FIG. 6 while the player is in a practice scenario. That is, in some implementations, the game device 100 does not debit game action fees, make wagers, or add to the game fund account during a practice scenario. In some implementations, the process discussed in connection with FIG. 6 is not suspended during the practice scenario, but one or more other game functions can be suspended. As an example, the game device 100 may suspend the ability for the player's character to be terminated during a practice scenario. Other suitable game functions can be suspended during the practice scenario. In some implementations where the player enters the practice scenario during a play of a game, the game device 100 may return the player to the point in the game where the player originally entered the practice scenario. Thus, in some implementations, the player can play a segment of a game in a practice scenario and then be returned to normal game play to replay the same segment of the game in a normal game play mode. In some implementations, where the player enters the practice scenario during a play of a game, the game device 100 may return the player to a point in the game after the practice scenario. Thus, in some implementations, by entering the practice scenario with one or more game functions suspended, the player can learn to play a particular game segment in a practice scenario and effectively skip that same particular game segment in normal game play mode.

Another example of a game modification based on the game fund account includes providing one or more virtual game objects or in-game assets to the player during a play of the game. As used herein, virtual game objects/in-game assets may include any suitable type of object such as, but not limited to, battle objects for a fighting game (e.g., light armor, heavy armor, axe, bow and arrows, sword, chainmail, etc.), racing objects for a racing game (e.g., different cars, different tires, engine modifications, etc.). In some implementations, the game device 100 may provide one or more in-game assets to the player independent of the game fund account (e.g., a game may supply certain in-game assets to the player, but reserve additional in-game assets for purchase or as awards). In some implementations, the game device 100 may provide one or more additional in-game assets to the player dependent on the game fund account. In some implementations, the game device 100 may be configured to provide one or more of the in-game assets in exchange for a game fund award amount from the player's game fund account.

In some implementations, the game device 100 can provide the player with various in-game assets based on a given probability for one or more of the in-game assets. In some implementations, the game device 100 may use the player game fund account to increase the probability that one or more of the in-game assets will appear in a game and decrease the probability that one or more other in-game assets will appear in a game. For example, if a player has sufficient funds in the player's game fund account, the game device 100 may debit a game fund award amount from the game fund account to increase the probability that one or more of the in-game assets will appear in a game. In some implementations, the game device 100 can change the probability based on the value of the game fund award. For example, in some implementations, the game device 100 may increase the probability that a bow and arrow appear in play of the game by 10% for a $2 game fund award debited from the player's game fund account, whereas the game device 100 may increase the probability that a bow and arrow appears in play of the game by 50% for a $10 game fund award debited from the player's game fund account.

In some implementations, the game device 100 may be configured to randomly provide one or more in-game assets from a set of in-game assets to a player in exchange for a game fund award amount from the player's game fund account. In some implementations, the one or more in-game assets in the set of in-game assets have an equal probability of being selected for the game device 100 to provide to the player. In some implementations, the one or more in-game assets in the set of in-game assets have one or more different probabilities of being selected for the game device 100 to provide to the player. In some implementations, the game device 100 may take a game fund award amount from the player's game fund account in exchange for obtaining one of the randomly selected in-game assets. In some implementations, the game fund award amount debited for the random selection of an in-game asset is the same, regardless of the selected in-game asset. In some implementations, the game fund award amount debited for the random selection of an in-game asset varies based on a determined value of a selected in-game asset.

In some implementations, the game device 100 may take a game fund award amount from the player game fund account in exchange for changing the selection probability for one or more of the in-game assets in the set of in-game assets. For example, the game device 100 can increase the probability that one or more of the in-game assets will be randomly selected and provided to the player. This is useful in games where certain in-game assets have more value to a player than other in-game assets in a set of in-game assets. For example, the game device 100 may determine that a player's high skill game action (e.g., the player hit a bullseye in a target with bow and arrow)—triggers a transition point, which was detected in block 805 in FIG. 8A. The game fund award determination may result in a game modification based on the game fund award determination. The game device 100 may debit the game fund award amount from the player's game fund account to increase the probability that a new weapon (e.g., that is advantageous for the player), from a selectable set of weapons, is selected for the player as a game fund award. In some implementations, the game device 100 may debit a first game fund award amount for the random selection process and a second game fund award amount to alter the probability of selection for one or more of the in-game assets. In some implementations, the first game fund award amount and the second game fund award amount can be combined and debited as one fee or as separate fees. In some implementations, the game device 100 debits a game fund award amount from the player's game fund account to alter the selection probability of one or more of the in-game assets, but does not debit a game fund award amount for the award selection process.

In some implementations, the game device 100 can be configured with one or more sets of in-game assets. For example, the game device 100 can be configured with a first set of in-game assets that include virtual weapons (e.g., an axe, a sword, and a bow and arrow) and a second set of in-game assets that include virtual armor (e.g., light armor, heavy armor, and chainmail). In some implementations, the game device 100 may randomly determine with the RNG which one of the sets of in-game assets that the game device 100 will use for a random selection of in-game assets to provide to the player as an award/prize. In some implementations, the game device 100 may debit a game fund award amount from the player's game fund account to increase the probability that one of the sets of in-game assets is selected over the other sets of in-game assets for use in determining an in-game asset for the game fund award. It should be appreciated that the game device 100 may alter the selection probability of the sets of in-game assets as well as the selection of in-game assets within one or more of the sets. In some implementations, the game device 100 may debit a separate game fund award amount for altering the selection probability of the sets of in-game assets, the selection of in-game assets within one or more of the sets, and for the award selection process. In some implementations, the game device 100 may debit a game fund award amount for one or more of such game modifying activities.

In some implementations, the game device 100 may present options for the player to change the selection probabilities associated with in-game assets and sets of in-game assets (e.g., enabling the player to choose whether or not to make any changes to the selection probabilities). In some implementations, the game device 100 does not offer the player options to change the probabilities associated with in-game assets and sets of in-game assets and determines to make such change automatically and deducts the appropriate game fund award amounts from the player's game fund account. In some implementations, the game device 100 may perform the automatic changes to the selection probabilities based on factors such as, but not limited to, the value in the player's game fund account, expected value in the player's game fund account, actions the player made in the game, etc.

In some implementations, the game device 100 may enable the player to obtain one or more in-game assets independent of the game fund account during a play of the game. For example, in an adventure game, the player could have obtained an in-game asset by visiting a particular location in the game. However, the player may have been unaware of the location of the in-game asset and missed an opportunity to visit the particular location in the game. The player may have missed the in-game asset for other reasons (e.g., low skill, etc.). However, in some implementations, the game device 100 may offer an opportunity for the player to obtain the missed in-game asset based on the player's game fund account. For example, if the player's game fund account reaches a predetermined threshold, the game device 100 may automatically provide the player with the missed in-game asset. In some implementations, the game device 100 may offer the player the option to purchase the missed in-game asset and deduct a game fund award amount associated with the in-game asset upon the player selecting the option to obtain the in-game asset.

Another example of a game modification based on the game fund account includes changing the skill level required to meet one or more game objectives during a play of a game. In some implementations, skill-based games may receive player inputs for manipulating a play of a game, wherein the player inputs can contribute towards one or more game objectives. In some implementations, the player inputs may be detected as game action events in the game. Because players may vary in their level of skill, the player inputs that the game device 100 receives for the game may vary. For example, in a basketball game, player inputs may include determining a trajectory of a basketball (e.g., aiming a virtual character's body in the direction of a basket) and inputting an amount of force for the virtual character to apply to the basketball to get the basketball into the basket. For skilled players, the players inputs may include inputting a correct trajectory and/or inputting just enough force on the basketball to get the basketball into the basket. For less skilled players, the players inputs may include inputting an incorrect trajectory and/or inputting too much or too little force on the basketball. In some implementations, the game device 100 may deduct a game fund award amount from the player's game fund account to alter one or more functions or features of a game to reduce the player skill needed to achieve the one or more game objectives. In the basketball example, the game device 100 may debit a game fund award amount and then alter the player's inputs such that the player's inputs are adjusted so that the trajectory of the basketball is corrected to be accurate and the force inputs are also adjusted to be accurate so that the basketball will be thrown into the basket in some implementations. In a checkers game example, the game device 100 can debit a game fund award amount and then may restrict where and/or which checkers piece a player can move during a play of the game to better ensure that the player makes one or more correct moves. In another example, if a player is trying to hit a virtual target, the virtual target may become bigger so the player can more easily hit the virtual target. It should be appreciated that a variety of game functions and features can be altered to make a game easier for the player in exchange for a game fund award amount from the player's game fund account.

Another example of a game modification based on the game fund account includes changing a "level" in a play of the game. A level may be associated with items such as in-game assets, game objectives, game scenarios, virtual game characters, and aspects associated with these items that can be adjusted to provide an enhanced experience for a player. In one example, the game device 100 may change a virtual character's "level" (e.g., a character's overall skill and experience) in a play of the game based on the player's game fund account. In some implementations, games may include enabling a virtual character to gain skills and/or experience in a game. Gaining skills and/or experience may translate into a "level" of the virtual character. Virtual characters that obtain a higher level may become stronger, faster, or able to perform certain game actions that were previously unavailable to the virtual character in some implementations. In some implementations, increasing a virtual character's level may require a substantial investment of time independent of a game fund account or a game fund award. In some implementations, the game device 100 may enable the player to increase the player's virtual character's level based on the player's game fund account. For example, the game device 100 may increase the level of the player's virtual character when the player's game fund account reaches a predetermined threshold. In some implementations, the predetermined threshold of a player's game fund account may measure an amount of time and money the player has played the game or games associated with the player's game fund.

The game device 100 may include a level table that associates the game fund account balance ranges with level settings. One or more of the level settings provides different game play characteristics for the player's virtual character. In some implementations, the game fund account balance ranges are associated progressively with bronze, silver, gold, and diamond levels. These levels and associated ranges can be stored in a level table. During a play of a game, the game device 100 may look up the level table to determine a level setting for the player's virtual character based on matching the balance of the player's game fund account to the appropriate range identified for the bronze, silver, gold, and diamond levels. Thus, for example, if the player's game fund account balance is within the range for the silver level, the game device 100 may select to change the player's virtual character's level to the silver level. In some implementations, the silver level provides the virtual character with additional speed and strength over a virtual character at the bronze level. Similarly, the game objectives, game scenarios, and virtual characters provided in the game may change in accordance to the game play level, which can be tied to the balance of the player's game fund account in some implementations. Thus, in some implementations, as the player's game fund account balance increases as the player plays one or more games, the player's game fund account balance may progress through the level ranges thereby providing the player access to different in-game assets, game objectives, game scenarios, virtual game characters, and/or the like, which encourages continued game play. Increasing the level based on the game fund account provides an alternative way for a player to "level up" in addition to or as an alternative to developing great skill in a game or devoting substantial time to achieving the same "level up." In some implementations, the game device 100 may alternatively or additionally increase the level based on debiting one or more game fund award amounts from the player's game fund account.

Another example of a game modification based on the game fund account includes activating features in a game based on the player's game fund account reaching one or more threshold balances. For example, an available game feature may include reaching and fighting a particular character in a play of a game. The game device 100 may be configured to determine whether the player's game fund account balance has reached a threshold balance before the game device 100 allows the player to reach and fight the particular character in the play of the game. In some implementations, the game device 100 can be configured to prevent the player from reaching one or more levels of a game until the player's game fund account balance reaches a threshold balance. In some implementations, the game device can be configured to prevent the player from accessing certain in game assets until the player's game fund account balance reaches a threshold balance. In some implementations, once the player game fund account balance reaches certain threshold balances, the game device 100 can be configured to present one or more game features to the player. In some implementations, the game device can be configured to allow the player to skip one or more levels or game segments when the player's game fund account balance reaches a threshold balance.

In one example of modifying the play of the game based on the game fund account reaching a threshold balance, the game may include several game levels that the player completes to progress in the game. In some implementations, the game may require that the user complete one or more game levels in a particular order. One or more of the game levels can be difficult to complete. For example, a difficult level may be designed so that at least 95% (e.g., two standard deviations) of attempts to complete the difficult level fail. It should be appreciated that the difficulty can be measured in any suitable manner. In some implementations, one or more difficult levels may require specialized virtual game objects to complete and the virtual game objects are difficult for a player to obtain. Such difficult levels can be choke points that prevent a player from progressing in the game to subsequent levels. In some implementations, such a game is configured to allow skilled players to complete the difficult levels. In some implementations, the game device 100 can be configured to permit the player to bypass or skip the difficult level when the player's game fund account balance reaches a predetermined threshold. Once the game fund account reaches the threshold amount, the game device 100 may automatically skip one or more difficult levels. In some implementations, the game device 100 may enable the player to select/choose to skip one or more difficult levels. In some implementations, the game device 100 may enable a player to play the one or more difficult levels, which if completed, the game device 100 may provide a large game fund award to the player. It should also be appreciated that in some implementations, the difficult levels may also serve to permit the player to play the game for longer periods of time, which may allow the player to place additional wagers on wagering events and to build up the player's game fund account.

It should be noted that the discussion above regarding the modification of the game play based on a game fund is not exhaustive. There is a plethora of different game parameters that can be adjusted depending on the type of video game that is being played. In some form or fashion, the game fund account may be used to set these game parameters and thereby determine game flow, game objectives, game scenarios, virtual characters, in-game assets, awards/rewards, game segments, and/or the like. The player can thereby be encouraged to continue game play and thus continue wagering using the game fund account.

Although method operations can be described in a specific order, it should be understood that other housekeeping operations can be performed in between operations, or operations can be adjusted so that they occur at slightly different times, or can be distributed in a system which allows the occurrence of the processing operations at various intervals associated with the processing, as long as the processing of the overlay operations are performed in the desired way.

It will be appreciated by those skilled in the art that while the disclosure has been described above in connection with particular implementations and examples, the disclosure is not necessarily so limited, and that numerous other implementations, examples, uses, modifications and departures from the implementations, examples and uses are intended to be encompassed by the claims attached hereto. The entire disclosure of each patent and publication cited herein is incorporated by reference, as if each such patent or publication were individually incorporated by reference herein. Various features and advantages of the disclosure are set forth in the following claims.

Those skilled in the art will recognize improvements and modification to the implementations of the present disclosure. All such improvements and modifications are considered within the scope of the concepts disclosed herein and the claims that follow.

What is claimed is:

1. A method of operating a game device having an input device and a display, the method comprising:

receiving a value at a value acceptor associated with the game device and updating a player's credit account based on the value;

executing a play of a game on the game device, wherein at least a portion of the play of the game is displayed on the display;

detecting a game action event during the play of the game based in part on input from the input device;

deducting a game action fee from the player's credit account based on the game action event during the play of the game;

dynamically determining a wager portion of the game action fee;

dynamically determining a game fund portion of the game action fee;

storing the game fund portion in a game fund account associated with a player;

determining a game fund award from the game fund account based on a transition point during the play of the game;

updating the player's credit account based on the game fund award;

modifying the play of the game based on the game fund award; and debiting a game fund award amount from the game fund account, wherein modifying the play of the game comprises at least one of:

starting a practice scenario during the play of the game that allows the player to practice at least one game action, increasing a probability that in-game assets are provided during the play of the game, adjusting a level of skill to meet at least one game objective during the play of the game, determining a value of the game fund account; determining one of a plurality of predetermined value ranges that matches the value of the game fund account, wherein the one of the plurality of predetermined value ranges is associated with a level setting in the game; and modifying the game based on the level setting of the matches the determined one of the plurality of predetermine value ranges, providing a game event during the play of the game in response to the game fund account reaching a threshold value, or determining that the game fund account has reached a threshold monetary value; presenting a skip option for a segment of the game; and skipping the segment of the game when the player selects the skip option.

2. The method of operating the game device of claim 1, further comprising:

randomly determining an outcome for a wagering event for a wager, wherein the wager is based on the wager portion; and determining an award based on the outcome of the wagering event when the outcome is a winning outcome.

3. A method of operating a game device having an input device and a display, the method, comprising:

receiving a value at a value acceptor associated with the game device and updating a player's credit account based on the value;

executing a play of a game on the game device, wherein at least a portion of the play of the game is displayed on the display;

detecting a game action event during the play of the game based in part on input from the input device;

deducting a game action fee from the player's credit account based on the game action event during the play of the game;

dynamically determining a wager portion of the game action fee;

dynamically determining a game fund portion of the game action fee;

storing the game fund portion in a game fund account associated with a player;

determining a game fund award from the game fund account based on a transition point during the play of the game;

updating the player's credit account based on the game fund award;

modifying the play of the game based on the game fund award;

debiting a game fund award amount from the game fund account;

providing at least one in-game asset during to the player in response to debiting the game fund award amount from the game fund account associated with the player;

presenting an in-game asset purchase option during the play of the game for another in-game asset; and debiting a game fund award amount associated with the other in-game asset in response to receiving a player's selection of the in-game asset purchase option, wherein addition in-game assets were previously made available to collect during the play of the game and the player failed to previously obtain the additional in-game assets.

4. The method of operating the game device of claim 1, wherein modifying the play of the game further comprises modifying a timer based on debiting the game fund award from the game fund account.

5. The method of operating the game device of claim 1, wherein modifying the play of the game further comprises bypassing a segment of the game.

6. The method of operating the game device of claim 5, wherein bypassing the segment of the game comprises:

presenting a skip option for the segment of the game to the player; and receiving from the player, through a user interface, a selection of the skip option, wherein the bypassing of the segment of the game is in response to receiving the selection of the skip option.

7. The method of operating the game device of claim 1, wherein modifying the play of the game further comprises:

receiving, from a user interface, a selection of a skip option by the player; and bypassing of a segment of the game in response to receiving the selection of the skip option.

8. An electronic gaming device, comprising:

a display device;

an input device;

a value acceptor;

a value dispenser at least one processor; and at least one memory that stores computer executable instructions, wherein, when the computer executable instructions are executed by the at least one processor, the at least one processor are configured to:

receive a value at a value acceptor and updating a player's credit account based on the value execute a play of a game on the electronic game device, wherein at least a portion of the play of the game is displayed on the display device;

detect a game action event during the play of the game based in part on input from the input device;

deduct a game action fee from the player's credit account based on the game action event during the play of the game;

dynamically determine a wager portion of the game action fee;

dynamically determine a game fund portion of the game action fee;

store the game fund portion in a game fund account associated with the player;

determine a game fund award from the game fund account based on a transition point during the play of the game;

update the player's credit account based on the game fund award;

modify the play of the game based on the game fund award;

debit a game fund award amount from the game fund account;

provide at least one in-game asset to the player in response to debiting the game fund award amount from the game fund account associated with the player;

present an in-game asset purchase option during the play of the game for another in-game asset; and debit a game fund award amount associated with the other in-game asset in response to receiving a player's selection of the in-game asset purchase option, wherein additional in-game assets were previously provided during the play of the game and the player failed to previously obtain the additional in-game assets.

9. The electronic gaming device of claim 8, further comprising:

randomly determine an outcome for a wagering event for a wager, wherein the wager is based on the wager portion; and determine an award based on the outcome of the wagering event when the outcome is a winning outcome.

* * * * *